(12) United States Patent
Kajiyama et al.

(10) Patent No.: US 6,321,028 B1
(45) Date of Patent: *Nov. 20, 2001

(54) OPTICAL DISK RECORDING/REPRODUCTION APPARATUS FOR RECORDING/REPRODUCING INFORMATION TO/FROM OPTICAL DISK OF DIFFERENT STANDARDS

(75) Inventors: Seiji Kajiyama, Ibi-gun; Yoichi Tsuchiya, Hashima; Yasuyuki Kanou, Hashima; Shuichi Ichiura, Hashima; Hitotoshi Kimura; Toshio Harada, both of Ota; Yasuyuki Matsushita, Ora-gun, all of (JP)

(73) Assignee: Sanyo Electric Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 52 days.

(21) Appl. No.: 08/661,937

(22) Filed: Jun. 11, 1996

(30) Foreign Application Priority Data

Jun. 12, 1995 (JP) ..................................................... 7-144743
Oct. 30, 1995 (JP) ..................................................... 7-281928
Dec. 14, 1995 (JP) ..................................................... 7-326093

(51) Int. Cl.$^7$ ............................... H04N 5/85; G11B 7/00
(52) U.S. Cl. ........................................... 386/126; 369/118
(58) Field of Search ..................................... 386/126, 125; 369/44.23, 44.27, 58, 94, 110, 112, 118, 277; H04N 5/85, 5/84; G11B 7/00

(56) References Cited

U.S. PATENT DOCUMENTS

| | | | |
|---|---|---|---|
| 4,178,615 | * 12/1979 | Shimooka et al. | 369/118 |
| 4,665,512 | * 5/1987 | Ando | 369/112 |
| 5,230,770 | * 7/1993 | Kashiwagi | 369/277 |
| 5,281,797 | * 1/1994 | Tasuno et al. | 369/118 |
| 5,311,494 | * 5/1994 | Sugita et al. | 369/110 |
| 5,638,353 | * 6/1997 | Takahashi | 369/44.23 |
| 5,673,246 | * 9/1997 | Ootaki et al. | 369/112 |
| 5,757,742 | * 5/1998 | Akiba et al. | 369/44.23 |

FOREIGN PATENT DOCUMENTS

| | | |
|---|---|---|
| 4195937 | 7/1992 | (JP) . |
| 5303766 | 11/1993 | (JP) . |
| 6124477 | 5/1994 | (JP) . |

* cited by examiner

*Primary Examiner*—Huy Nguyen
(74) *Attorney, Agent, or Firm*—Hogan & Hartson LLP.

(57) ABSTRACT

An optical disk recording/reproduction apparatus includes a semiconductor laser, an objective lens provided opposite an optical disk, an optical system for supplying a laser beam from the semiconductor laser to the objective lens, an aperture for not intercepting the laser beam in reproducing from a digital video disk and intercepting an outermost portion of the laser beam in reproducing from a compact disk, and a tracking servo mechanism for moving the objective lens in a tracking direction orthogonal to the running direction of a track of the optical disk. The aperture has an oblong opening that is longer in the tracking direction than in the track running direction.

37 Claims, 26 Drawing Sheets

9a

— AREA OF DEPOSIT OF SILVER ATOM
---- AREA OF ORIENTATION OF SILVER COMPOUND

U.S. 6,321,028 B1

OPTICAL DISK RECORDING/ REPRODUCTION APPARATUS FOR RECORDING/REPRODUCING INFORMATION TO/FROM OPTICAL DISK OF DIFFERENT STANDARDS

CROSS-REFERENCE TO RELATED APPLICATION

This application is related to a application Ser. No. 08/608,848, filed Feb. 29, 1996, now U.S. Pat. No. 5,787, 061, commonly assigned with the present invention.

BACKGROUND OF THE INVENTION

1. Field of the Invention

The present invention relates to optical disk recording/ reproduction apparatuses, and more particularly to an optical disk recording/reproducing apparatus that can record/ reproduce information to/from optical disks having different substrate thicknesses or recording densities.

2. Description of the Background Art

In these recent years, an optical disk recording/ reproduction apparatus is proposed that can read out information recorded on an optical disk of approximately 1.2 mm in thickness such as a CD (compact disk) and a CD-ROM using a semiconductor laser. In such optical disk recording/ reproduction apparatuses, control is provided of focus servo and tracking servo with respect to an objective lens for pickup. A laser beam is directed to a pit train on a recording surface, whereby signals of audio, video, and data are reproduced.

During the past few years, there has been intensive efforts to increase the density for the purpose of recording motion pictures of significant duration on such optical disks. For example, a SD (super density) standard is proposed to record information of approximately 5 G bytes on one side of an optical disk having a diameter of 12 cm which is identical to that of a CD-ROM. According to this SD standard, the thickness of the optical disk is approximately 0.6 mm. One optical disk having two disk substrates of the SD standard laminated to each other on their back side surfaces can be recorded with information of approximately 10 G bytes. In contrast, a MMCD (multi media compact disk) standard is proposed that records information of approximately 3.7 G bytes on one layer of an optical disk having a diameter of 12 cm which is identical to that of a CD-ROM. According to this MMCD standard, the thickness of an optical disk is approximately 1.2 mm. An optical disk having a 2-layer structure of the MMCD standard can have information of approximately 7.4 G bytes recorded thereon.

In general, an objective lens for pickup is designed taking into account the thickness of the substrate of the optical disk of interest, the refractive index and the wavelength of the employed semiconductor laser. Reproduction of information from an optical disk having a thickness different from that of design is impossible since the spot of the laser beam cannot be focused on the recording plane of the optical disk. For example, an objective lens designed to conform to an optical disk having a substrate of 1.2 mm in thickness cannot focused the spot of a laser beam on the recording surface of an optical disk having a substrate of 0.6 mm in thickness. Information cannot be reproduced from such an optical disk.

Tanaka et al. disclose an optical head including a spherical optical element for correcting aberration caused by difference in the substrate thickness of optical disks in Japanese Patent Laying-Open No. 5-303766. This optical element functions to alter the numerical aperture (NA) of the objective lens.

An objective lens is generally shifted in a vertical direction (tracking direction) with respect to the optical axis of the laser beam according to tracking control. However, the aperture of Tanaka et al. is fixed with respect to the optical axis of the laser beam independent of the tracking control. Therefore, when the objective lens is shifted in a tracking following range similar to the case lacking an aperture, the amount of deformation of the laser beam spot directed onto a recording plane will be increased according to the offset of the objective lens with respect to the optical axis of the laser beam. This phenomenon is due to the fact that reduction in the diameter of the laser beam corresponding to the aperture causes a great deformation in the laser beam spot as if the amount of displacement of the objective lens is relatively increased.

This beam spot is deformed in the running direction of the track and also the tracking direction which is perpendicular to the running direction. Deformation in the running direction of the track will become the cause of degrading the jitter. Deformation in the tracking direction will become the cause of cross talk noise.

In a conventional apparatus shown in FIG. 1A, an aperture 9 having a complete circle of an opening shown in FIG. 1B is employed. Aperture 9 is fixed with respect to the optical axis of the laser beam. In contrast, an objective lens 5 is displaced in the tracking direction so that the laser beam spot traces the track of an optical disk 6 in fidelity. Therefore, the optical axis of objective lens 5 is often offset from the optical axis of the laser beam.

FIG. 6 is a graph showing jitter with respect to the tracking following range. As indicated by the solid circle, a conventional apparatus exhibits a sudden increase in jitter as the tracking following range of object lens 5 is increased since the offset between the center of object lens 5 and the center of aperture 9 becomes greater.

In the future, it is expected that an optical disk having a substrate thickness of approximately 1.2 mm with the current density (CD, CD-ROM), an optical disk of the MMCD standard having a substrate thickness of approximately 1.2 mm with high density, and an optical disk of the SD standard having a substrate thickness of approximately 0.6 mm with high density will be concurrently available in the market. Optical disks according to the MMCD standard and the SD standard are called "digital video disks" (DVD) to be discriminated from CDs and CD-ROMs. "MMCD" and "SD" are temporary names, and may be changed in the future. In the present application, the MMCD and the SD standards are used with the implication of defining the physical characteristics of an optical disk, such as the substrate thickness and recording density.

SUMMARY OF THE INVENTION

An object of the present invention is to reduce jitter in an optical disk recording/reproduction apparatus that can reproduce information from optical disks of different standards such as a digital video disk and a compact disk using one optical pickup.

According to the present invention, an optical disk recording/reproduction apparatus that can record and/or reproduce information to/from an optical disk includes an objective lens, an optical system, and a light intercepting unit. The objective lens is provided opposite the optical disk. The optical system supplies a laser beam to the objective lens. The light intercepting unit intercepts a portion of a laser beam according to the standard of the optical disk to render a first diameter of the laser beam longer than a second diameter orthogonal to the first diameter.

A main advantage of the above-described optical disk recording/reproduction apparatus is that the configuration of a laser beam spot is hardly changed since the laser beam extensive in the tracking direction is incident upon the objective lens even when the tracking direction is displaced according to tracking control, whereby jitter is reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
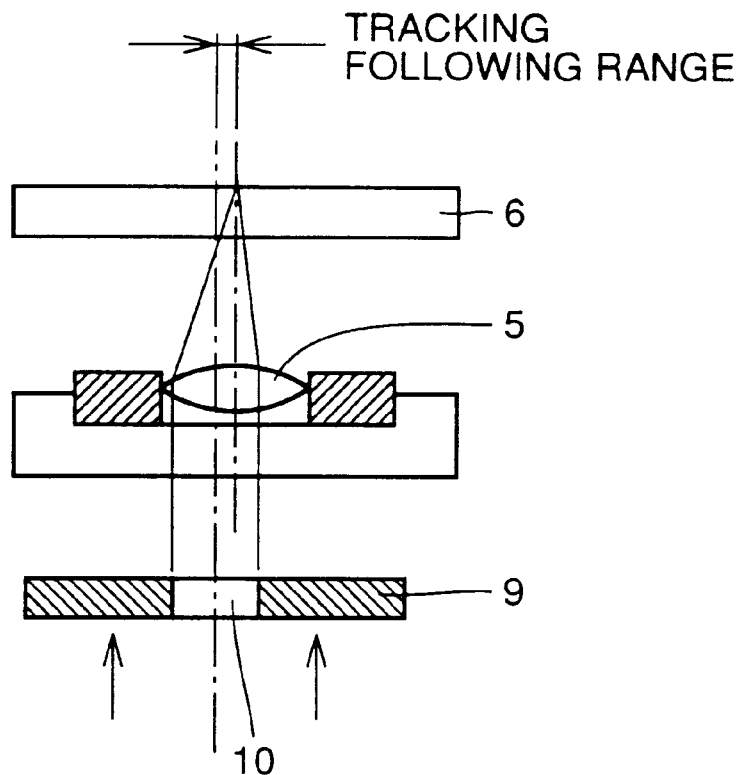
FIG. 1A is a schematic diagram showing an optical structure of a conventional optical pickup device.
Figure 1B:
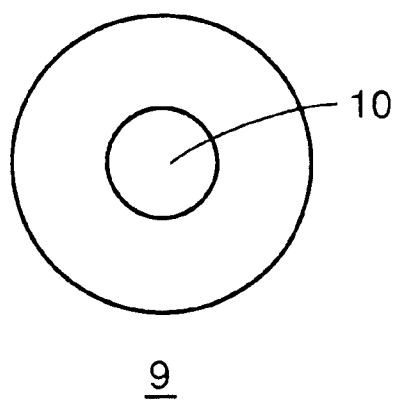
FIG. 1B is a front view of an aperture of the device of FIG. 1A.

Embodiments of the present invention will be described hereinafter with reference to the drawings. In the drawings, like reference characters indicate the same or corresponding components.

First Embodiment

Figure 2:
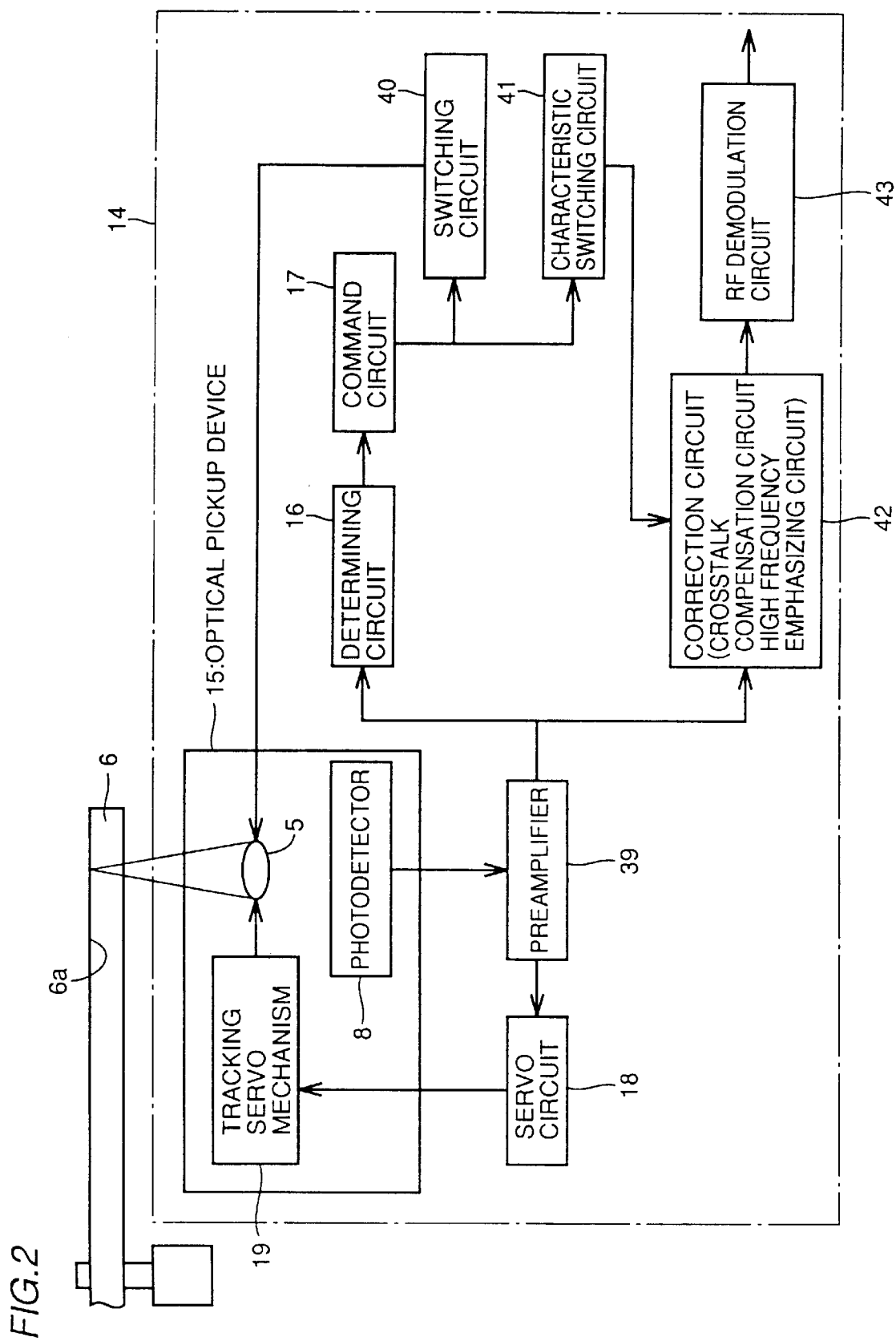
FIG. 2 is a block diagram schematically showing a structure of an optical disk recording/reproduction apparatus according to a first embodiment of the present invention.

Referring to FIG. 2, an optical disk recording/reproduction apparatus 14 according to a first embodiment of the present invention includes an optical pickup device 15, a preamplifier 39 for amplifying a reproduced signal from a photo detector 8 in optical pickup device 15, a servo circuit 18 responsive to the amplified reproduced signal for generating a control signal to provide control of tracking and focusing, a determining circuit 16 responsive to a reproduced signal from preamplifier 39 for identifying the thickness of the substrate of a set optical disk, a command circuit 17 responsive to a determination signal from determining circuit 16 for generating a command signal, a numerical aperture switching circuit 40 responsive to a command signal from command circuit 17 to switch the effective numerical aperture of an objective lens 5 in an optical pickup device 15, a correction circuit 42 for correcting a reproduced signal from preamplifier 39, a characteristic switching circuit 41 responsive to a command signal from command circuit 17 for switching the characteristics of correction circuit 42, and an RF demodulation circuit 43 for demodulating a reproduced signal from correction circuit 42.

Optical pickup device 15 includes objective lens 5 responsive to a control signal from servo circuit 18 and provided opposite optical disk 6, and a tracking servo mechanism 19 for moving objective lens 5 in the tracking direction orthogonal to the running direction of the track so that the laser beam spot formed on optical disk 6 by objective lens 5 traces the track of optical disk 6.

Figure 3:
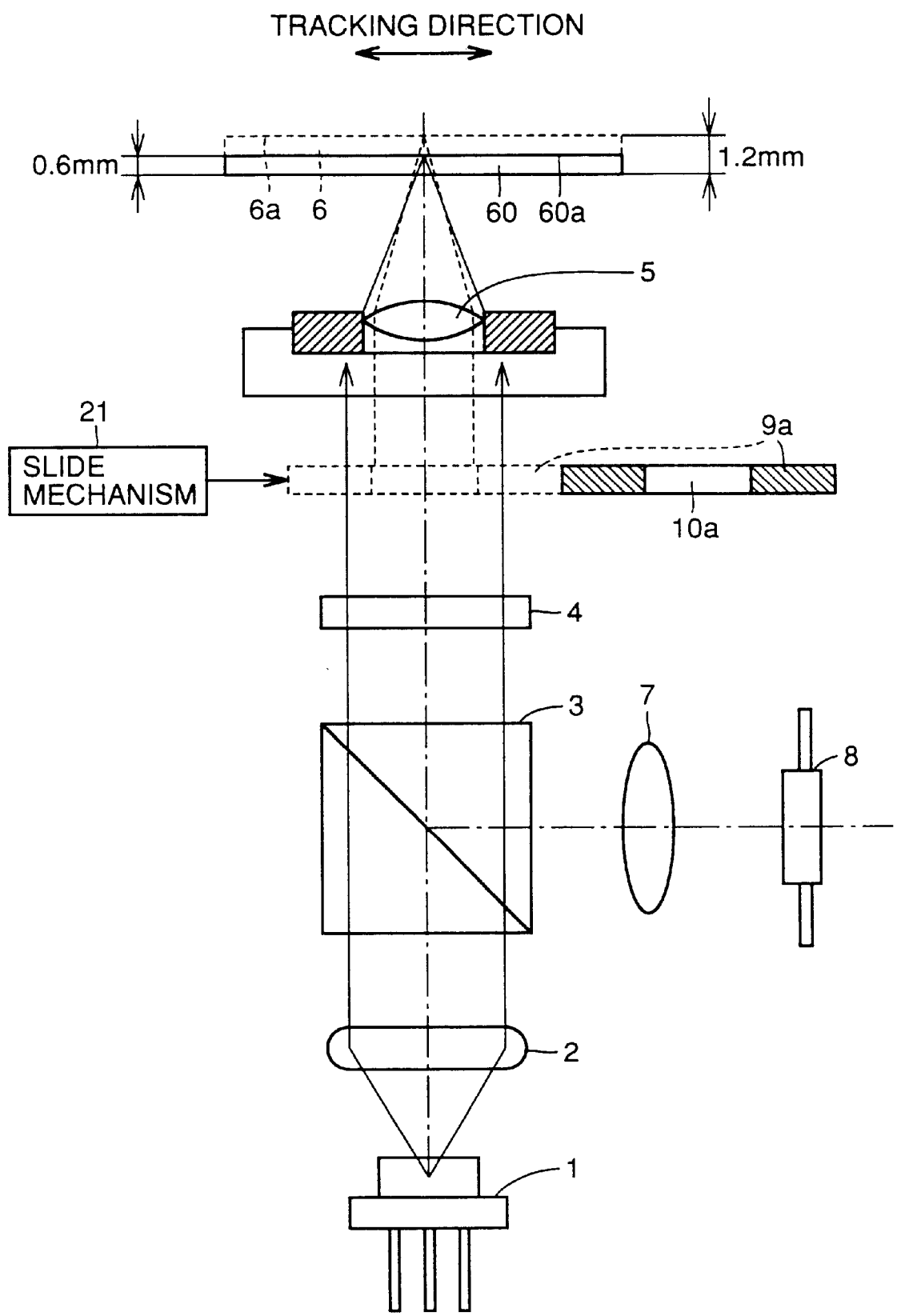
FIG. 3 is a schematic diagram showing an optical structure of the optical pickup device of FIG. 2.

Referring to FIG. 3, optical pickup device 15 further includes a semiconductor laser 1 for generating a laser beam having a wavelength of 635 (tolerance ±15) nm, a collimator lens 2, a polarization beams splitter 3, a quarter-wave plate 4, a condenser lens 7, and a photodetector 8. Collimator lens 2, polarization beam splitter 3, and ¼ wavelength plate 4 form the optical system for providing a laser beam from semiconductor laser 1 to objective lens 5. Optical pickup device 15 further includes an aperture 9a having an opening 10a, and a slide mechanism 21 responsive to a determination signal from determining circuit 16 of FIG. 2 to slide in or out aperture 9a between quarter wave plate 4 and objective lens 5.

An optical disk recording/reproduction apparatus including such an optical pickup device 15 can reproduce information from a standard compact disk (including CD-ROM) and a digital video disk of the SD standard. A compact disk has a substrate of 1.2 (tolerance ±0.1) mm in thickness with a standard recording density. A digital video disk of the SD standard has a substrate of 0.6 (tolerance ±0.05) mm in thickness with a recording density higher than that of a compact disk.

Figure 4:
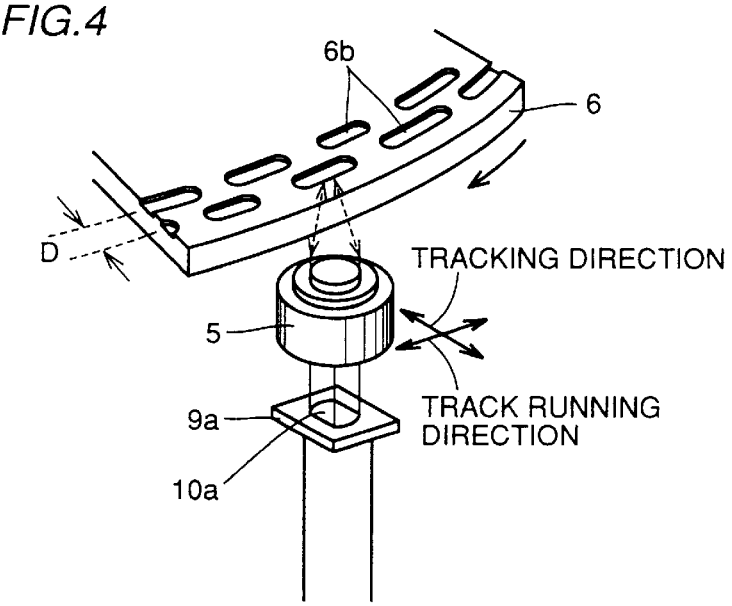
FIG. 4 is a perspective view of the optical pickup device of FIG. 3 showing the main structure.

Optical disks such as a compact disk and a digital disk have tracks formed in a spiral or concentric manner. As shown in FIG. 4, a plurality of pits 6b are formed on a substrate 6. A train of pits 6b form a track. The recording density is generally defined by a pitch D of such a track.

Objective lens 5 focuses a laser beam on a signal recording plane 6a or 60a of substrate 6 or 60 to form a spot thereon. Tracking servo mechanism 19 of FIG. 2 moves objective lens 5 in the tracking direction (a direction orthogonal to the track running direction) so that the spot traces the track in fidelity. This is generally called tracking control. According to a three beam system, for example, servo circuit 18 in FIG. 2 responds to a tracking error signal from photodetector 8 to determine the offset of the laser beam spot in the left/right direction of the track running direction to supply a control signal indicating the determination result to tracking servo mechanism 19. Tracking servo mechanism 19 responds to that control signal to move objective lens 5 towards the tracking direction.

Figure 5A:
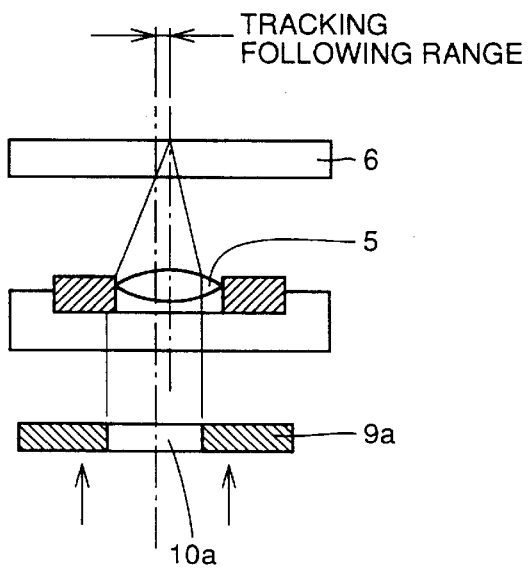
FIG. 5A is a schematic diagram showing an optical structure of the optical pickup device of FIG. 3.

Therefore, the optical axis of objective lens 5 is often offset from the optical axis of laser beam as shown in FIG. 5A. Aperture 9a is fixedly positioned to the main body of optical pickup device 15 together with semiconductor laser 1, collimator lens 2, polarization beam splitter 3, and quarter wave plate 4. Therefore, aperture 9a will not be moved together with objective lens 5 by tracking control.

Aperture 9a has an opening 10a longitudinal in the tracking direction. Diameter La of opening 10a parallel to the track running direction is 2.35 mm, and diameter Lb of opening 10a parallel to the tracking direction is 3.7 mm. Opening 10a has a shape approximating a rectangle that is longer in the tracking direction. The opposite shorter sides respectively form an arc. By employing such an aperture 9a, the effective numerical aperture of objective lens 5 in the track running direction is 0.35 (tolerance ±0.05).

Objective lens 5 is designed so that a laser beam of 635 nm in wavelength is focused on a signal recording plane 60a of a DVD of 0.6 mm in thickness. The numerical aperture of objective lens 5 is set to 0.6 (tolerance ±0.05), and the effective luminous flux diameter is set to 4 mm.

In contrast to semiconductor laser 1, collimator lens 2, polarization beam splitter 3, quarter wave plate 4, condenser lens 7, and photodetector 8 all fixed to a frame (not shown) of optical pickup device 15, objective lens 5 can be shifted in the tracking direction with respect to the frame of optical pickup device 15 by means of tracking servo mechanism 19.

An operation of reproducing information from a DVD with a substrate of 0.6 mm in thickness will first be described. A laser beam from semiconductor laser 1 is set parallel by collimator lens 2 to enter objective lens 5 via polarization beam splitter 3 and quarter wave plate 4. The incident laser beam in objective lens 5 is directed onto signal recording plane 60a of the DVD through a polycarbonate substrate 60 of 0.6 mm in thickness. The diameter of the beam spot formed on signal recording plane 60a is 0.91 (tolerance ±0.1) $\mu$m. The laser beam reflected from signal recording plane 60a passes through substrate 60, objective lens 5, and quarter wave plate 4 to return to polarization beam splitter 3. The beam is reflected by polarization beam splitter 3 to be gathered into photodetector 8 by condenser lens 7.

An operation of reproducing information from a CD having a substrate of 1.2 mm in thickness will be described hereinafter. When a CD is set, determining circuit 16 of FIG. 2 supplies a determination signal to command circuit 17. In response to the command signal from command circuit 17, a slide mechanism 21 in optical pickup device 15 positions aperture 9a mechanically between quarter wave plate 4 and objective lens 5. Aperture 9a does not move in connection with the tracking control, and is fixedly positioned with respect to the optical axis of the laser beam.

When aperture 9a is inserted between quarter wave plate 4 and objective lens 5, the outermost portion of the laser passing through quarter wave plate 4 is intercepted so that the central portion of the laser beam indicated by the dotted line enters objective lens 5. Then, the laser beam passes through polycarbonate substrate 6 of 1.2 mm in thickness to be directed on signal recording plane 6a of the CD. The diameter of the beam spot formed on signal recording plane 6a is 1.5 (tolerance ±0.1) $\mu$m and 1.6 (tolerance ±0.1) $\mu$m in the track running direction and the tracking direction, respectively. More specifically, the diameter of the laser beam parallel to the tracking direction becomes longer than the diameter parallel to the track running direction.

Since the tracking direction diameter Lb of opening 10a of aperture 9a is longer than the track running direction diameter La by approximately two times the tracking following range, the tracking direction diameter of the beam spot will not become greater than 1.6 (tolerance ±0.1) μm even when objective lens 5 is shifted in the tracking direction.

Similarly, the laser beam reflected at signal recording plane 6a passes through substrate 6, objective lens 5, and quarter wave plate 4 to return to polarization beam splitter 3. The beam is reflected at polarization beam splitter 3 to be concentrated into photodetector 8 by condenser lens 7.

Figure 6:
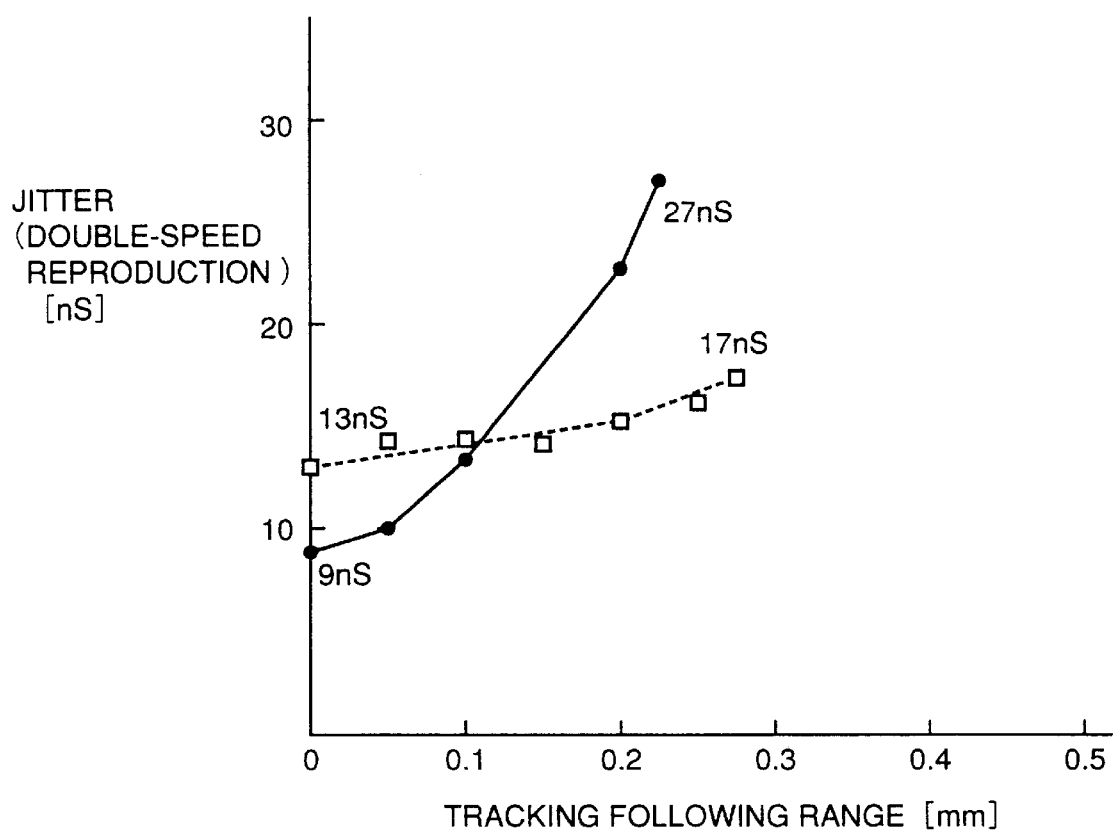
FIG. 6 is a graph showing the relationship between a tracking following range and jitter.

The relationship between the tracking following range and jitter in a double speed reproduction mode when such aperture 9a is used is indicated by the open square (□) of FIG. 6. It is appreciated from FIG. 6 that jitter is improved significantly as the tracking following range is increased in comparison to that of a circle aperture 9.

Jitter suppression can be confirmed even when the tracking direction diameter Lb of opening 10a is set to more than 2.58 mm, that is, set to more than 1.1 times that of the track running direction.

Slide mechanism 21 is implemented by a plunger for example that pushes/withdraws aperture 9a.

A reflecting mirror included in the above-described device for altering the optical path between quarter wave plate 4 and objective lens 5 by 90° C. is not shown in the drawing for the sake of visuality. This reflecting mirror serves to reduce the size of the optical pickup device by changing the optical path as described above. The reflecting mirror can be a prism used in common as quarter wave plate 4.

The above-described device can use a half mirror instead of polarization beam splitter 3 and quarter wave plate 4.

The arrangement of aperture 9a in the above-described device is not limited to the position between quarter wave plate 4 and objective lens 5, and can be disposed between semiconductor laser 1 and collimator lens 2, between collimator lens 2 and polarization beam splitter 3, or between polarization beam splitter 3 and quarter wave plate 4.

Diameter La of opening 10a of aperture 9a parallel to the track running direction is selected so that the effective numerical aperture of objective lens 5 is 0.35 in the track running direction. Diameter Lb of opening 10a of aperture 9a parallel to the tracking direction is determined by adding two times the length of the tracking following range to diameter La parallel to the track running direction.

However, diameter La parallel to the track running direction may be determined so that the effective numerical aperture of objective lens 5 is smaller than 0.35 in the track running direction and diameter Lb parallel to the tracking direction may be determined by adding two times the length of the tracking following range to diameter La. In this case, diameters La and Lb are preferably determined so that the effective numerical aperture of objective lens 5 in the tracking direction is at least 0.35.

Figure 5B:
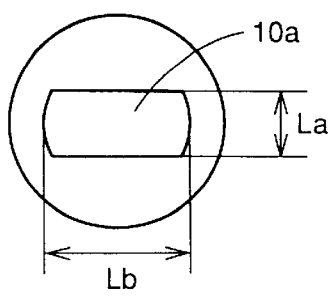
FIG. 5B is a front view of the aperture of FIG. 5A.
Figure 7A:
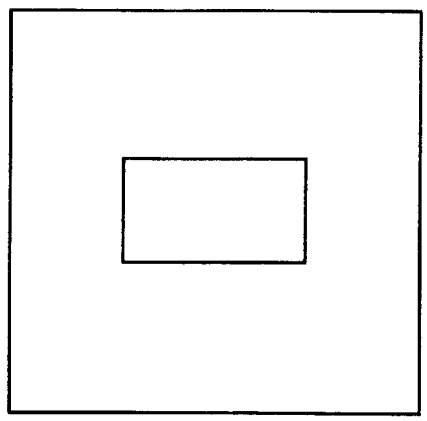
FIGS. 7A–7E are front views showing other examples of an aperture of FIG. 5B.
Figure 7B:
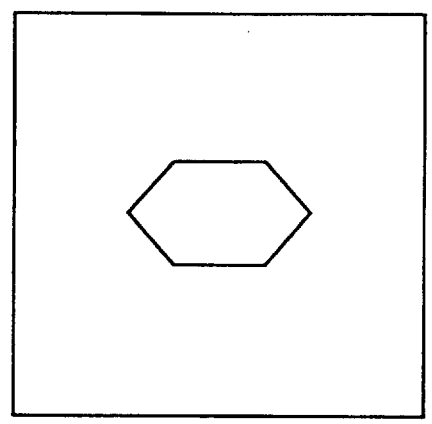
Figure 7C:
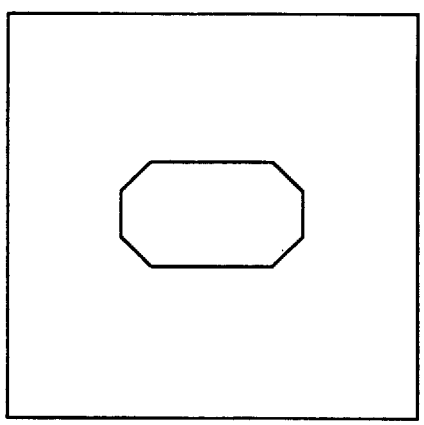
Figure 7D:
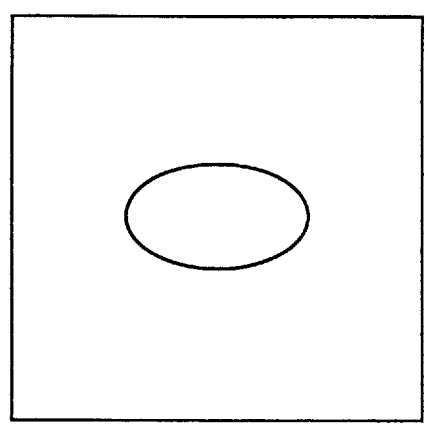

The configuration of the opening is not limited to that shown in FIG. 5B, and may be an oblong rectangle as shown in FIG. 7A, a hexagon as shown in FIG. 7B, an octagon as shown in FIG. 7C, or an oval as shown in FIG. 7D.

Figure 7E:
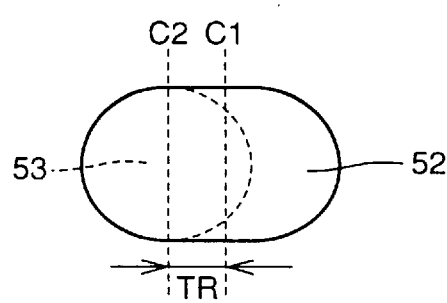

Although the above-described oblong opening has the diameter parallel to the tracking direction longer than the diameter parallel to the track running direction by two times the tracking following range of TR, the longer diameter can be longer than the shorter diameter by just the tracking following range of TR as shown in FIG. 7E. More specifically, the center line C1 of opening 52 is offset from the center line C2 of true circle 53 by just the tracking following range of TR. The optical axis of the laser beam is located at the center of true circle 53. The longer diameter is preferably 1.1–1.2 times the shorter diameter.

In the case where a laser beam of 650 (tolerance ±15) nm in wavelength is used instead of a laser beam of 635 nm so that the diameter of the beam spot is increased by approximately 0.1 μm, the effective numerical aperture of objective lens 5 in the track running direction should be set to 0.36~0.41 in inserting the aperture. The tolerance of the laser beam of 635 nm and 650 nm in wavelength may be ±50 nm instead of ±15 nm.

In the above-described device, aperture 9a with an opening 10a of a fixed configuration is inserted into the optical path of the laser beam by slide mechanism 21. However, an aperture mechanically altered in configuration in response to a determination signal from determining circuit 16 may be constantly disposed in the optical path of the laser beam. A plurality of diaphragm blades forming an opening can be used as such an aperture.

Figure 8A:
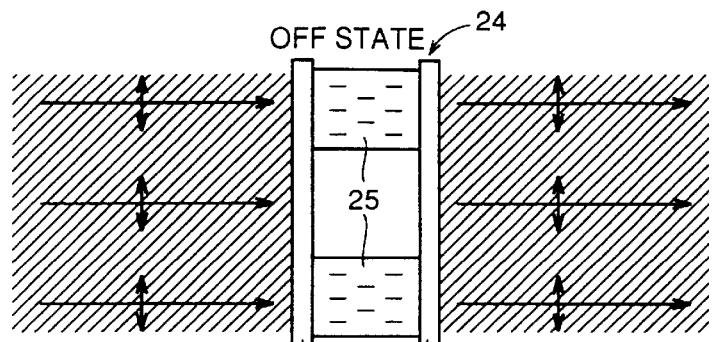
FIGS. 8A and 8B are schematic diagrams showing a guest-host type liquid crystal shutter that can be used instead of the aperture of FIG. 5B.
Figure 8B:
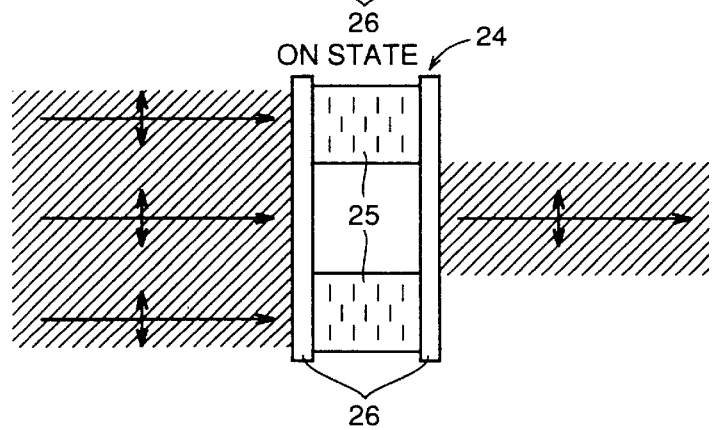

An aperture having an opening that is deformed electrically can be used instead of the above-described aperture that has an opening deformed mechanically. This aperture can be implemented by a liquid crystal shutter 24 as shown in FIGS. 8A and 8B. Liquid crystal shutter 24 includes a guest-host type liquid crystal 25 of a doughnut configuration and transparent electrode plates 26 sandwiching liquid crystal 25. When guest-host type liquid crystal 25 attains an OFF state as shown in FIG. 8A (reproduction from DVD), liquid crystal shutter 24 allows the laser beam to pass through. When guest-host type liquid crystal 25 attains an ON state as shown in FIG. 8B (CD reproduction), liquid crystal shutter 24 allows passage of only the central portion of the laser beam and intercepts the outermost portion of the laser beam by scattering. Liquid crystal shutter 24 has an opening extensive in the tracking direction. An electrical aperture such as liquid crystal shutter 24 is advantageous over a mechanical aperture in that malfunction does not easily occur.

Second Embodiment

Figure 9:
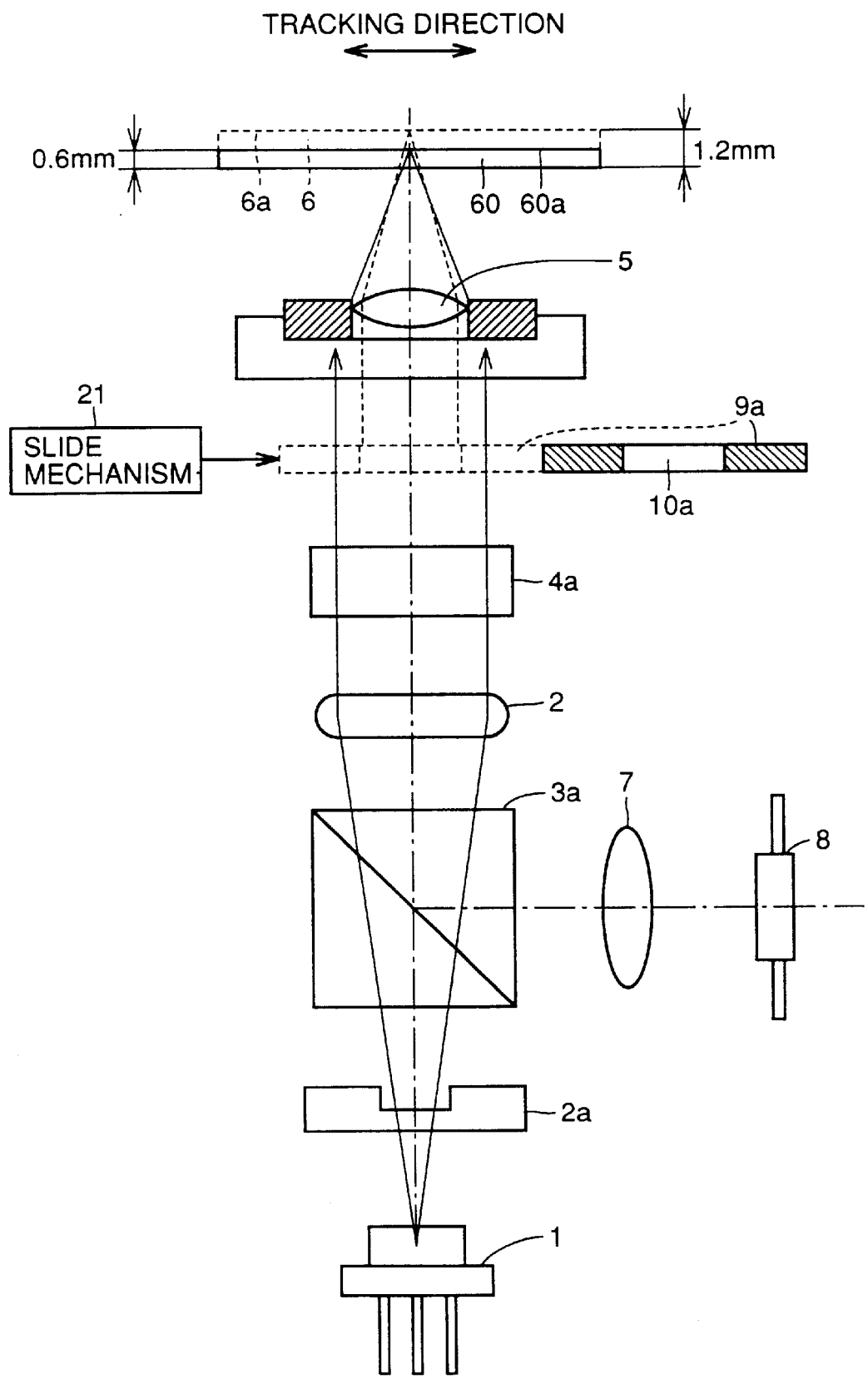
FIG. 9 is a schematic diagram showing an optical structure of an optical pickup device in an optical disk recording/reproduction apparatus according to a second embodiment of the present invention.

An optical disk recording/reproduction apparatus according to a second embodiment of the present invention employs an optical system shown in FIG. 9 instead of that shown in FIG. 3. More specifically, a half mirror 3a is used instead of polarization beam splitter 3. A diffraction grating 2a is disposed between semiconductor laser 1 and half mirror 3a. Collimator lens 2 is disposed between reflecting mirror 4a and half mirror 3a. Quarter wave plate 4 is not used.

Reproduction of information from a DVD by the optical system of the second embodiment is set forth in the following. A laser beam having a wavelength of 635 nm from semiconductor laser 1 passes through diffraction grating 2a and half mirror 3a to be incident upon collimator lens 2. The laser beam incident of collimator lens 2 is set parallel to further enter objective lens 5 by reflecting mirror 4a. Objective lens 5 is designed to conform to a DVD similar to the objective lens of the first embodiment. Therefore, objective lens 5 focuses a laser beam on a signal recording plane 60a of a DVD as in the first embodiment. The laser beam reflected at signal recording plane 60a passes through substrate 60, objective lens 5, reflecting mirror 4a and collimator lens 2 to return to half mirror 3a. The laser beam is reflected at half mirror 3a to be condensed into photodetector 8 by condenser lens 7.

A CD reproducing operation is as described above, and description thereof will not be repeated.

According to the optical system of the second embodiment, the number of components is fewer than that of the optical system of the first embodiment. Therefore, the optical pickup device is reduced in size and cost.

Third Embodiment

Figure 10:
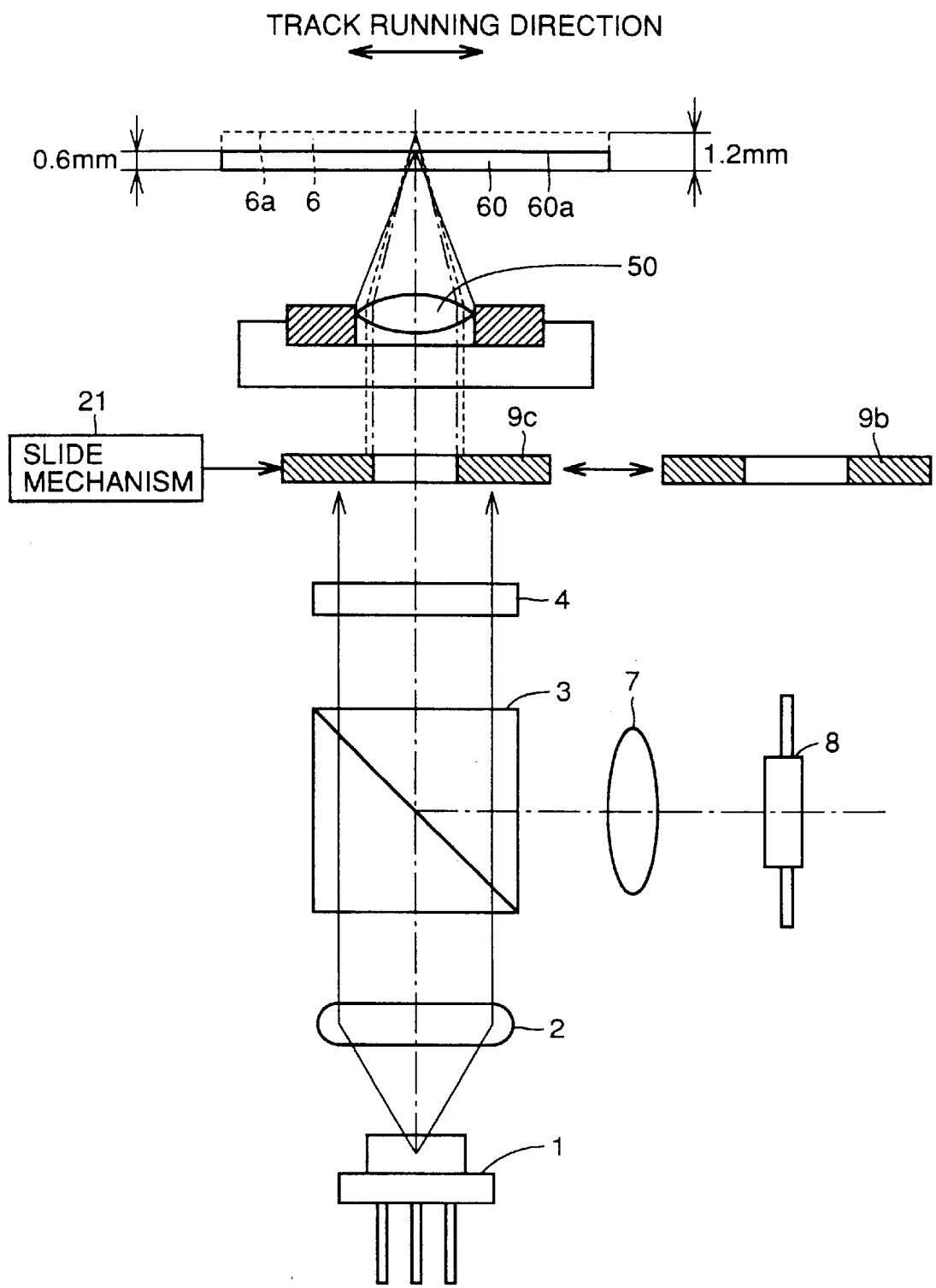
FIG. 10 is a schematic diagram showing an optical structure of an optical pickup device in an optical disk recording/reproduction apparatus according to a third embodiment of the present invention.

An optical disk recording/reproduction apparatus according to a third embodiment shown in FIG. 10 can reproduce information from a DVD of the MMCD standard in addition to the above-described CD and DVD of the SD standard. A DVD of the MMCD standard has a recording density higher than that of a CD. The substrate of a DVD of the MMCD standard is 1.2 (tolerance ±0.05) mm in thickness. In FIG. 10, the arrow indicates the track running direction.

Figure 11:
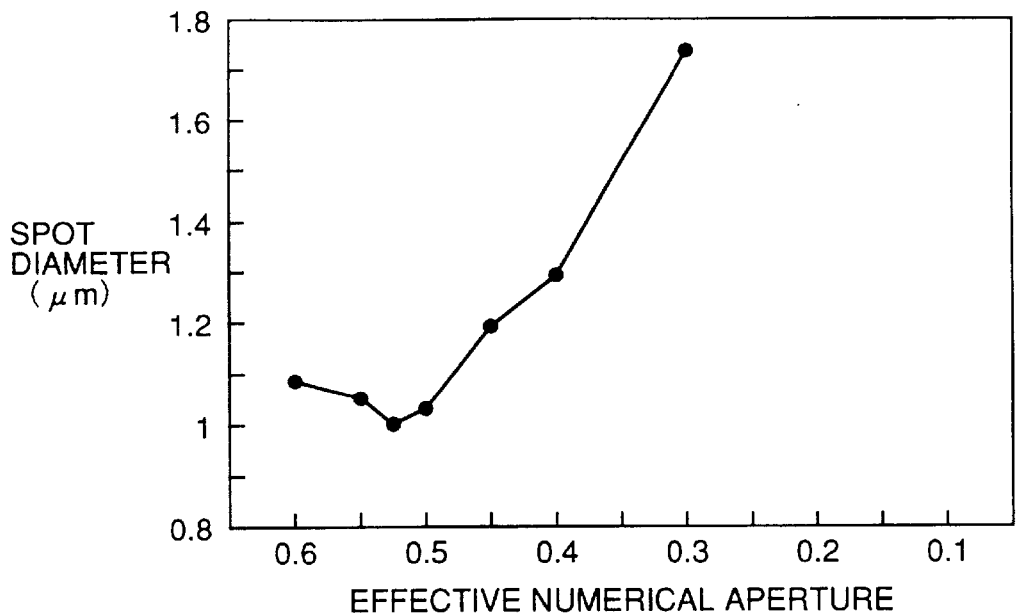
FIG. 11 is a graph showing the relationship between the effective numerical aperture and spot diameter when an aperture for a digital video disk of the SD standard is employed in the optical pickup device of FIG. 10, and a laser beam is focused on a disk substrate of 0.6 mm in thickness using an objective lens for 0.8 mm.

An objective lens 50 of the third embodiment is designed so that a laser beam of 635 (tolerance ±15) nm in wavelength is focused at a position of 0.8 mm in depth from the surface of substrate 6 or 60 of an optical disk. The numerical aperture of objective lens 50 is 0.6 (tolerance ±0.05), and the effective luminous flux diameter is 4 mm. The relationship between the effective numerical aperture of objective lens 50 and the beam spot diameter is shown in FIG. 11 when a laser beam having a wavelength of 635 nm is to be focused on a signal recording plane 60a of a DVD of the SD standard using such objective lens 50. It is appreciated from FIG. 11 that the diameter of the beam spot is the minimum of 1 (tolerance ±0.1) μm when the effective numerical aperture is 0.52.

By using an objective lens 50 having a numerical aperture of 0.52 that is designed so that a laser beam of 635 nm in wavelength is focused at a position of 0.8 mm in depth, information can be reproduced from a DVD of the SD standard.

Figure 12:
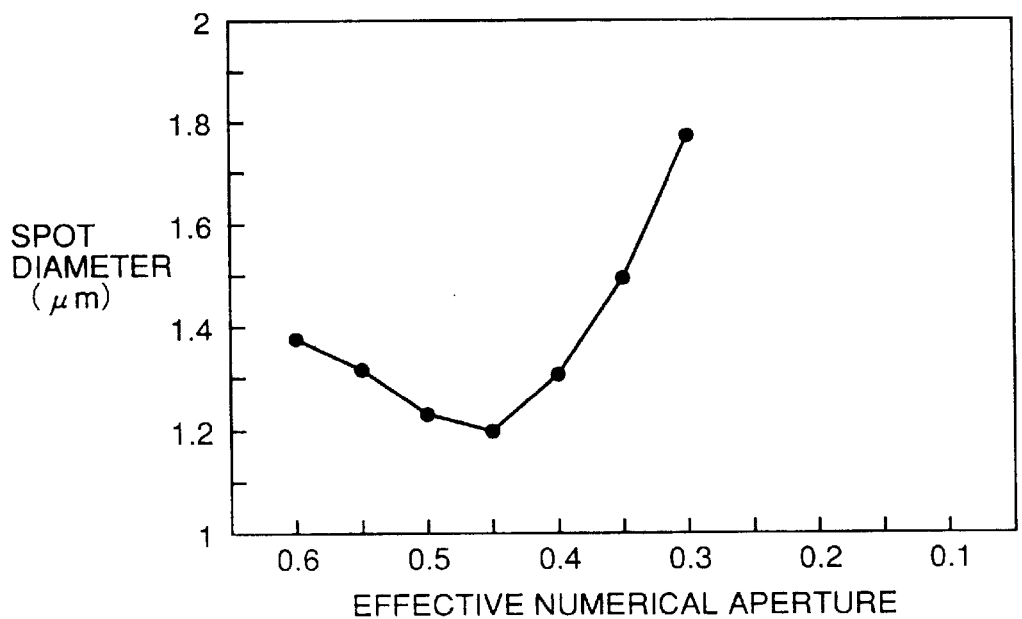
FIG. 12 is a graph showing the relationship between the effective numerical aperture and spot diameter when an aperture for a compact disk or a digital video disk of the MMCD standard is employed in the optical pickup device of FIG. 10, and a laser beam is focused on a disk substrate of 1.2 mm in thickness using an objective lens for 0.8 mm.

The relationship between the effective numerical aperture of objective lens 50 and the beam spot diameter is shown in FIG. 12 when a laser beam of 635 nm in wavelength is focused on a signal recording plane 60a of a CD or a DVD of the MMCD standard having a substrate of 1.2 mm in thickness using objective lens 50. It is appreciated from FIG. 12 that the beam spot diameter exhibits the minimum of 1.2 (tolerance ±0.1) μm when the effective numerical aperture is 0.45.

By using objective lens 50 having a numerical aperture of 0.45 that is designed so that a laser beam having a wavelength of 635 nm is focused at a position of 0.8 mm in depth, information can be reproduced from both a CD and a DVD of the MMCD standard.

Reproduction from a DVD of the SD standard is set forth in the following. In this case, an aperture 9b is inserted in the optical path of the laser beam by slide mechanism 21. Similar to the above-described aperture 9a, aperture 9b is fixedly positioned with respect to the optical axis of a laser beam without being shifted in association with the motion of objective lens 50 by the tracking control operation. Aperture 9b has an opening prolonged in the tracking direction similar to aperture 9a of FIG. 5B. Diameter La parallel to the track running direction is 3.47 mm, and diameter Lb parallel to the tracking direction is 4 mm. As a result, the effective numerical aperture of objective lens 50 in the track running direction is 0.52 (tolerance ±0.02). If diameter Lb parallel to the tracking direction is greater than 3.8 mm, that is, greater than 1.1 times the diameter La parallel to the track running direction, generation of jitter can be suppressed.

When aperture 9b is inserted in FIG. 10, the outermost portion of the laser beam passing through quarter wave plate 4 is intercepted so that only the central portion indicated by a dash line enters objective lens 50. The beam spot diameter formed on signal recording plane 60a by objective lens 50 is 1 (tolerance ±0.1) μm and 1.1 (tolerance ±0.1) μm in the track running direction and the tracking direction, respectively. Similar to aperture 9a, the opening of aperture 9b is longer in the tracking direction than in the track running direction by the length of approximately two times the tracking following range. Therefore, the diameter in the tracking direction of the beam spot will not become greater than 1.1 μm even when objective lens 50 is moved in the tracking direction.

An operation of reproducing from a CD or from a DVD of the MMCD standard will be described hereinafter. In this case, an aperture 9c is inserted in the optical path of the laser beam by slide mechanism 21. Similar to the above-described apertures 9b, aperture 9c is fixedly positioned with respect to the optical axis of the laser beam. Similarly, the opening of aperture 9c is prolonged in the tracking direction as shown in FIG. 4. Diameter La in the track running direction and diameter Lb in the tracking direction of the opening of aperture 9c are 3 mm and 4 mm, respectively. As a result, the effective numerical aperture in the track running direction of objective lens 50 becomes 0.45 (tolerance ±0.02). Jitter generation can be suppressed if the diameter parallel to the tracking direction is greater than 3.3 mm, that is greater than 1.1 times the diameter parallel to the track running direction.

When aperture 9c is inserted in FIG. 10, the outermost portion of the laser beam passing through quarter wave plate 4 is intercepted so that only the central portion indicated by a chain dotted line enters objective lens 50. The diameter of the beam spot formed on signal recording plane 6a by objective lens 50 is 1.2 (tolerance ±0.1) μm and 1.3 (tolerance ±0.1) μm in the track running direction and tracking direction, respectively. Since the opening of aperture 9c is longer in the tracking direction than the track running direction by approximately two times the length of the tracking following range, the diameter of the beam spot in the tracking direction will not become greater than 1.3 μm even if objective lens 50 is shifted in the tracking direction.

Since information is reproduced from an optical disk having two types of substrate thicknesses of 0.6 mm and 1.2 mm in the third embodiment using objective lens 50 having a numerical aperture of 0.6 designed so that a laser beam is focused at a position of 0.8 mm in depth, the high frequency characteristics of a reproduced signal differs. It is therefore desirable to use an ultra high frequency emphasizing circuit as in the above-described first embodiment so that the high frequency level of a reproduced signal is equal to each other in reproducing information from a DVD of the SD standard having a substrate thickness of 0.6 mm and from a CD or a DVD of the MMCD standard having a substrate thickness of 1.2 mm.

Figure 8C:
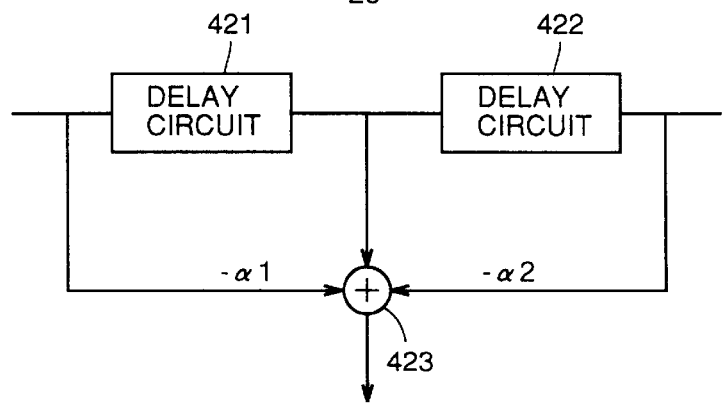
FIG. 8C is a block diagram showing a structure of a crosstalk compensating circuit which is an example of a correction circuit in FIG. 2.

Referring to FIG. 8C, a crosstalk compensating circuit includes a delay circuit 421 for delaying a reproduced signal from preamplifier 39 of FIG. 2 by a period required for optical disk 6 to rotate once, a delay circuit 422 for delaying the delayed reproduced signal for a period required for one rotation of the disk, and an adder 423 receiving a reproduced signal from preamplifier 39, a delayed reproduced signal from delay circuit 421, and a further-delayed reproduced signal from delay circuit 422. In adder 423, the reproduced signal from preamplifier 39 is multiplied by an inherent factor of $-\alpha 1$, and the delayed reproduced signal from delay circuit 422 is multiplied by an inherent factor of $-\alpha 2$. These products are added to the delayed reproduced signal from delay circuit 421.

It is now assumed that a reproduced signal from a certain track is supplied from delay circuit 421 into adder 423. Here, a reproduced signal from the next track to be reproduced is supplied from preamplifier 39 into adder 423. A reproduced signal from an adjacent track already reproduced is supplied from delay circuit 422 into adder 423. Therefore, even if a reproduced signal from delay circuit 421 includes a reproduced signal from an adjacent track, such a signal component is removed by adder 423. According to the crosstalk compensating circuit, reproduced signals from the two adjacent tracks of the currently reproduced track are subtracted. Thus, crosstalk from an adjacent track can be removed.

Inherent factors of $-\alpha 1$ and $-\alpha 2$ in adder 423 are selected appropriately according to the level of crosstalk from adjacent tracks. In reproducing information from a DVD of the SD standard, crosstalk is increased since the diameter of the beam spot becomes slightly greater than the standard size. Therefore, inherent factors $-\alpha 1$ and $-\alpha 2$ employed in reproducing information from a DVD of the SD standard are set greater than those of reproducing information from a CD. These inherent factors are switched by characteristic switching circuit 41 of FIG. 2.

Figure 8D:
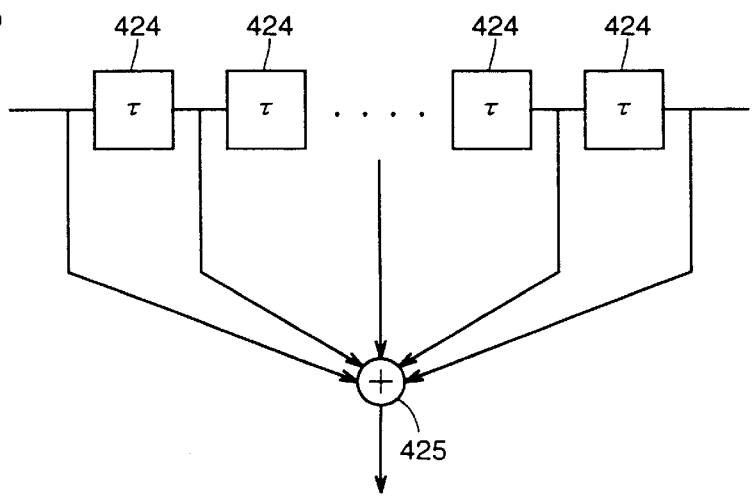
FIG. 8D is a block diagram showing a structure of an ultra high frequency emphasizing circuit which is another example of the correction circuit of FIG. 2.

Referring to FIG. 8D, an ultra high frequency emphasizing circuit includes at least three delay circuits 424 having a predetermined delay time of $\tau$, and an adder 425. In a CD reproduction mode, the high frequency components of a reproduced signal is lowered. Therefore, the high frequency component of a reproduced signal is emphasized in reproducing information from a CD than in reproducing information from a DVD of the SD standard. The level of emphasizing the high frequency component is switched by characteristic switching circuit 41 of FIG. 2.

Since the diameter of a beam spot is slightly greater than the defined diameter in reproducing from a DVD of the SD or MMCD standard, the resolution in the tracking direction is slightly degraded. There is a possibility of increase in crosstalk from an adjacent track. Therefore, it is desirable to provide a crosstalk compensating circuit as in the first embodiment in the third embodiment.

By using an aperture 9b or 9c with an opening prolonged in the tracking direction than the tracking direction as in the third embodiment, jitter is reduced significantly as the tracking following range is increased comparable to the case where aperture 9 of a circular opening is used.

In the above-described third embodiment, the diameter of the opening of aperture 9c in the track running direction is determined so that the effective numerical aperture of objective lens 50 becomes 0.45 in the track running direction. The diameter of the opening of aperture 9c in the tracking direction is determined by adding a length of two times the tracking following range to the diameter in the track running direction of the aperture.

However, the diameter of the opening in the track running direction of aperture 9c can be determined so that the effective numerical aperture of objective lens 50 is 0.45, and the diameter of the opening in the tracking direction of aperture 9c determined by adding two times the length of the tracking following range to the track running direction diameter of the opening. Here, it is desirable that the effective numerical aperture in the tracking direction of objective lens 50 is not smaller than 0.45.

The diameter of the opening in the track running direction of aperture 9b is determined so that the effective numerical aperture of objective lens 50 becomes 0.52 in the track running direction. Also, the diameter of the opening in the tracking direction of aperture 9b is determined by adding the length of two times the tracking following range to the diameter of the opening in the track running direction. The effective luminous flux diameter of objective lens 50 is to be set to 4 mm at most even in the case where it exceeds 4 mm.

However, the diameter of the opening in the track scanning direction of aperture 9b can be determined so that the effective numerical aperture of objective lens 50 becomes smaller than 0.52 in the track running direction, and the aperture of the opening in the tracking direction of aperture 9b can be determined by adding two times the length of the tracking following range to the diameter of the opening in the track running direction. In this case, the effective numerical aperture in the tracking direction of objective lens 50 is desirably not smaller than 0.52.

Although the third embodiment was described using objective lens 50 designed so that a laser beam is focused at a position of 0.8 mm in depth, reproduction is possible using an objective lens designed so that a laser beam is focused at a position of 0.7~0.9 mm in depth.

It is to be noted that the third embodiment can be modified appropriately similar to the above-described first embodiment.

Information can be reproduced more stably from a CD or a DVD of the MMCD standard using an objective lens with a numerical aperture of 0.52 (tolerance ±0.02) designed so that a laser beam is focused at a position of 1.2 mm in depth in comparison to the case of the third embodiment in which objective lens 50 with a numerical aperture of 0.06 is designed and used so that a laser beam is focused at a position of 0.8 mm in depth. More specifically, an aperture having an opening longer in the tracking direction than in the track running direction is inserted in the laser beam optical path in reproducing from a CD. This aperture is removed from the optical path in reproducing from a DVD of the MMCD standard. In this case, diameter La in the track running direction is set to 2.35 mm and diameter Lb in the tracking direction is set to 3.7 mm in FIG. 4 so that the effective numerical aperture of the objective lens in the track running direction becomes 0.35 (tolerance ±0.03). In reproducing from a CD, information can be reproduced even if the above-described aperture is not inserted. However, insertion of the aperture to set the effective numerical aperture of the objective lens in the track running direction to 0.35 allows a further favorable reproduction since coma generated is reduced when the substrate of the CD is tilted or warped.

Fourth Embodiment

Figure 13:
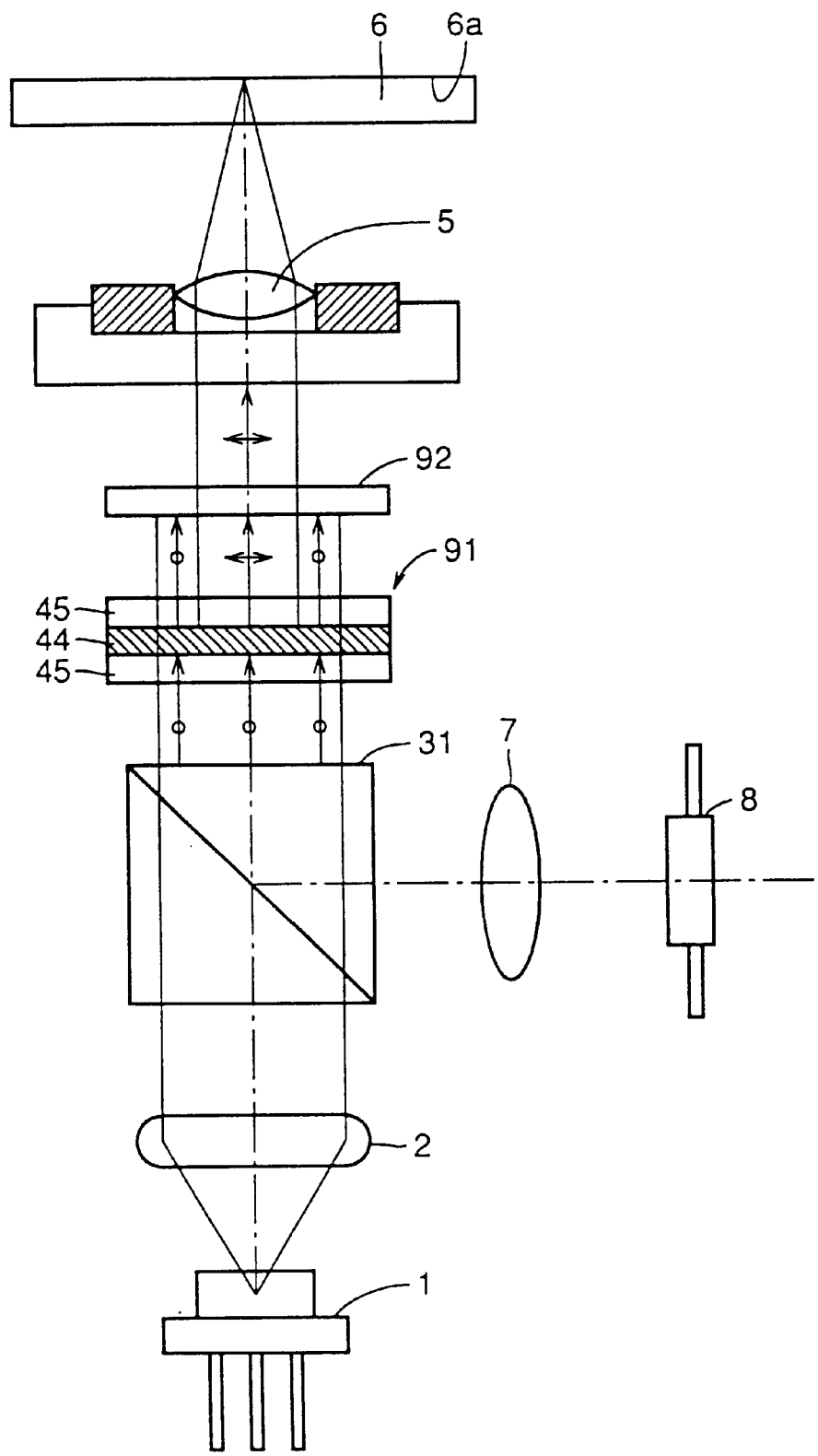
FIGS. 13 and 14 are schematic diagrams showing an optical structure of an optical pickup device in an optical disk recording/reproduction apparatus according to a fourth embodiment of the present invention, the former and latter showing reproduction from a compact disk and a digital video disk of the SD standard, respectively.
Figure 14:
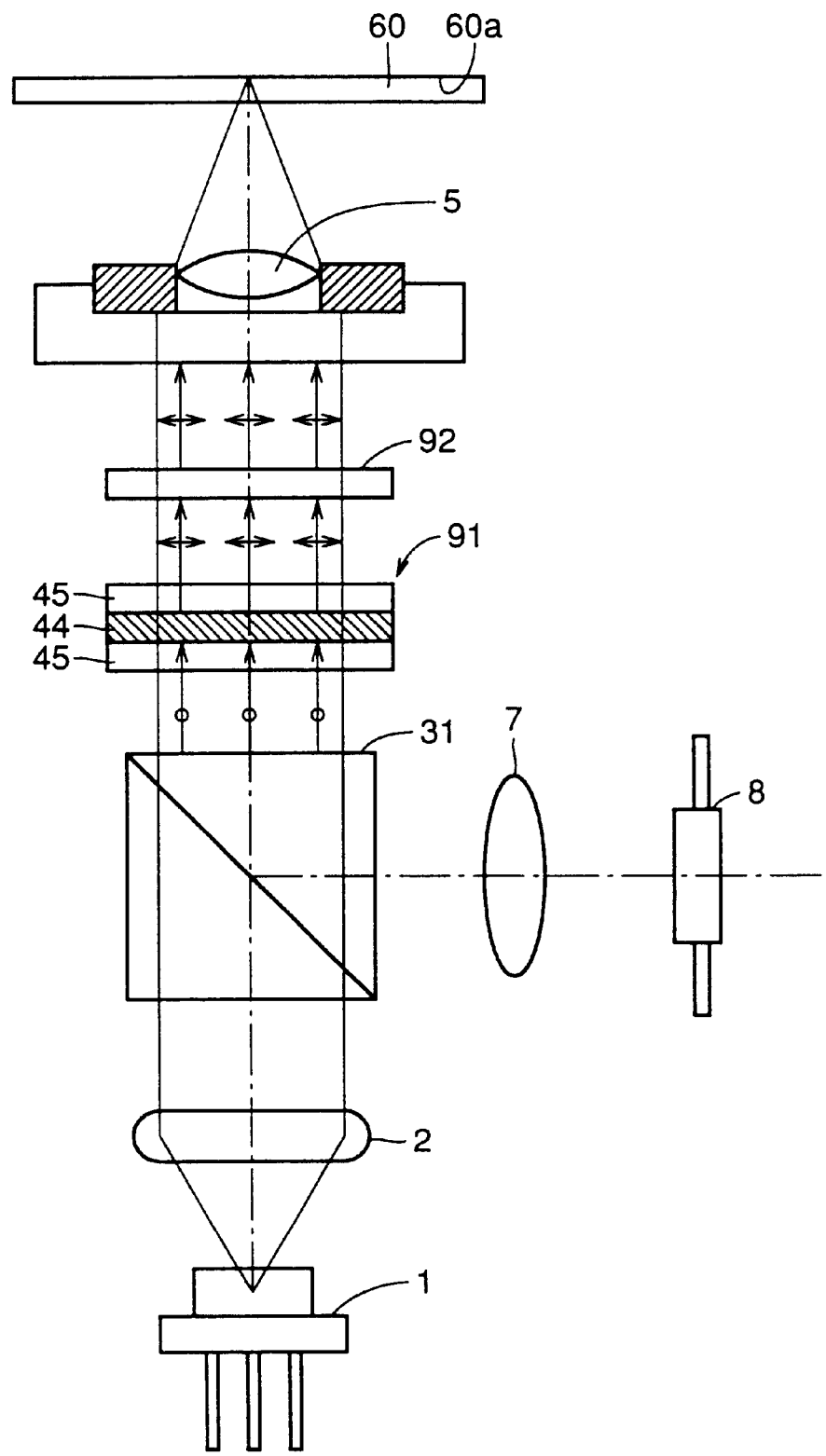

As shown in FIGS. 13 and 14, an optical disk recording/reproduction apparatus according to a fourth embodiment of the present invention includes a half mirror 31 instead of polarization beam splitter 3 of FIG. 3, and a polarization plane rotating unit 91 and a polarizing filter 92 instead of aperture 9a and slide mechanism 21. Quarter wave plate 4 of FIG. 3 is not used. According to the apparatus of the fourth embodiment, information can be reduced from a CD and also from a DVD of the SD standard as in the first embodiment.

Figure 15:
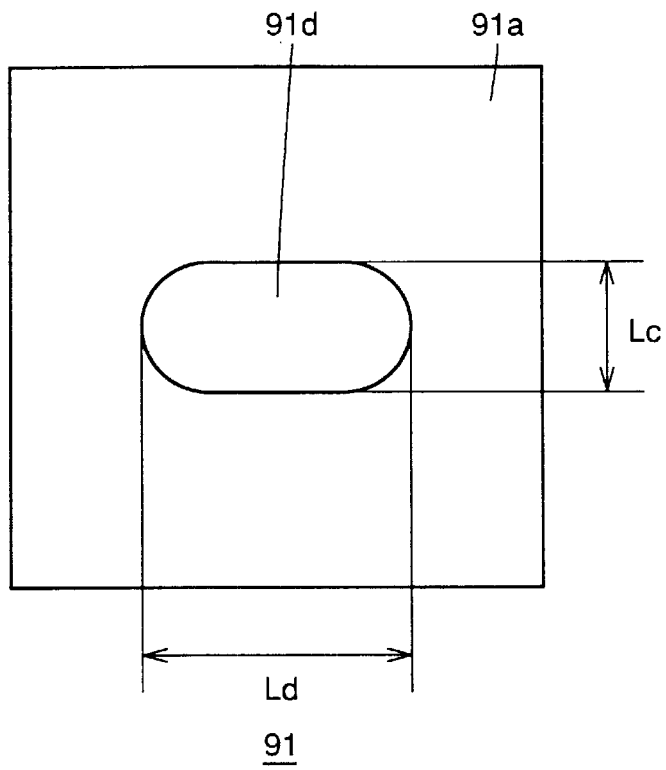
FIG. 15 is a front view of a polarization plane rotating unit in FIGS. 13 and 14.

Polarization plane rotating unit 91 includes a TN (twisted nematic) type liquid crystal 44, and two transparent electrode plates 45 sandwiching liquid crystal 44. Polarization plane rotating unit 91 is divided into two regions of an outermost region 91a and a central region 91b as shown in FIG. 15. A transparent conductive film is formed only at outermost region 91a of each transparent electrode plate 45. Therefore, the exact laser beam is passed through in the region where a voltage is applied without having the polarization direction altered. In the region where a voltage is not applied, the laser beam is transmitted with the polarization direction altered by 90°. When objective lens 5 having a numerical aperture of the 0.6 (tolerance ±0.05) and an effective luminous flux diameter of 4 mm is used, a diameter Lc in parallel with the track running direction of central region 91b is set to 2.35 mm, and a diameter Ld in parallel with the tracking direction is set to 3.7 mm. As a result, the effective numerical aperture of objective lens 5 in the track running direction becomes 0.35 (tolerance ±0.01). Jitter can be reduced if diameter Ld parallel to the tracking direction is greater than 2.58 mm, that is, greater than 1.1 times diameter Lc parallel in the track running direction.

Figure 16:
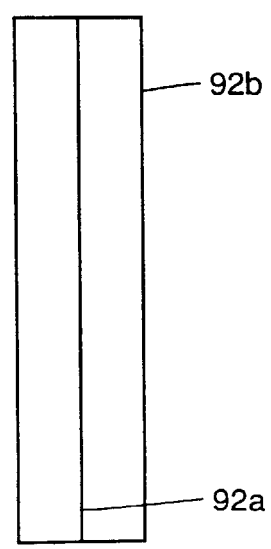
FIG. 16 is a side view of the polarization plane rotating unit of FIG. 15.

As shown in FIG. 16, polarizing filter 92 includes a polarizing film 92a for transmitting only a laser beam that is polarized in a particular direction, and two glass plates 92b sandwiching film 52. In FIGS. 13 and 14, polarizing filter 92 transmits only a laser beam having a plane of polarization parallel to the plane of the drawing sheet. Any material that is transparent and superior in optical characteristics can be used for glass plate 92b. A resin such as polycarbonate or PMMA may be used instead of glass. Since polarizing filter 92 is fixed to objective lens 5, tracking control and focus control can be carried out stably as polarizing filter 92 is lighter.

An operation of reproduction from a DVD of the SD standard will be described hereinafter with reference to FIG. 14. In this case, a voltage is not applied to transparent electrode plate 45 of polarization plane rotating unit 91. Therefore, a laser beam of 635 (tolerance ±15) nm in wavelength from semiconductor laser 1 that is polarized in a direction perpendicular to the plane of the drawing sheet is rendered parallel by collimator lens 2. Half of the laser beam passes through half mirror 31. The laser beam transmitted through half mirror 31 has its polarization direction rotated by 90° entirely by polarization plane rotating unit 91. Therefore, the laser beam in a direction parallel to the plane of the drawing sheet enters polarizing filter 92. The laser beam polarized in the direction parallel to the plane of the drawing sheet is entirely transmitted through polarizing filter 92 without being intercepted to enter objective lens 5. According to objective lens 5, the diameter of the beam spot formed on signal recording plane 60a is 0.91 (tolerance ±0.1) μm.

An operation of reproducing from a CD will be described with reference to FIG. 13. In this case, a voltage is applied to transparent electrode plate 45 of polarization plane rotating unit 91. A laser beam from semiconductor laser 1 that is polarized in a direction perpendicular to the plane of the drawing sheet similarly enters polarization plane rotating unit 91. Laser beam entering outermost region 91a of polarization plane rotating unit 91 is directly transmitted without having the plane of polarization rotated. The laser beam entering central region 91b of polarization plane rotating unit 91 is transmitted having its polarization direction rotated by 90°. Such a laser beam having planes of polarization orthogonal to each other enters polarizing filter 92. Thus, a laser beam transmitted through outermost region 91a that is polarized in a direction perpendicular to the plane of the drawing sheet is intercepted by polarizing filter 92, whereas the laser beam transmitted through central region 91b that is polarized in a direction parallel to the plane of the drawing sheet passes through polarizing filter 92 to enter objective lens 5. In this case, the diameter of the beam spot formed on signal recording plane 6a by objective lens 5 is 1.5 (tolerance ±0.1) μm and 1.6 (tolerance ±0.1) μm in the track running direction and tracking direction, respectively.

By using a polarization plane rotating unit 91 having a central region 91b longitudinal in the tracking direction as in the fourth embodiment, jitter can be reduced significantly as a function of increase of the tracking following range comparable to the case where a polarization plane rotating unit having a circular central region is used.

A reflecting mirror included in the apparatus for the purpose of altering the optical path 90° between polarizing filter 92 and objective lens 5 is not shown for the sake of visuality.

Although half mirror 31 is used in the above-described fourth embodiment, a quarter wave plate can be inserted between polarizing filter 92 and objective lens 5, and a polarization beam splitter can be used instead of half mirror 31. By virtue of such a structure, the usage efficiency of a laser beam is improved.

The arrangement of polarization plane rotating unit 91 and polarizing filter 92 between half mirror 31 and objective lens 5 is not limited as described in the fourth embodiment, and may be arranged between semiconductor laser 1 and collimator lens 2, or between collimator lens 2 and half mirror 31. Polarization plane rotating unit 91 does not necessarily have to be adjacent to polarizing filter 92, and may be spaced from polarizing filter 92 as long as it is between polarizing filter 92 and semiconductor laser 1.

Furthermore, a hologram element with polarizing characteristics or polarizing glass can be used instead of polarizing filter 92. An optical thin film with polarizing characteristics can be used instead of polarizing filter 92 on the surface of the optical material, for example on a reflecting mirror located between polarization plane rotating unit 91 and objective lens 5.

A STN (super twisted nematic) liquid crystal or a ferroelectric type liquid crystal can be used instead of TN type liquid crystal 44 in the fourth embodiment to rotate electrically the plane of polarization.

When a positive voltage is applied for a short time, the ferroelectric type liquid crystal rotates the plane of polarization of the laser beam by 45° and maintains that status. When a negative voltage is applied for a short time, the ferroelectric type liquid crystal rotates the plane of polarization of the laser beam 45° in a direction opposite to that when a positive voltage is applied, and the state is maintained. Therefore, by supplying a positive voltage in reproduction from a digital video disk and applying a negative voltage in reproduction from a compact disk, the ferroelectric type liquid crystal can rotate the plane of polarization of a laser beam by 90°. Usage of such a ferroelectric type liquid crystal allows the applying time period of voltage for rotating the plane of polarization to be shortened to reduce power consumption.

Figure 17:
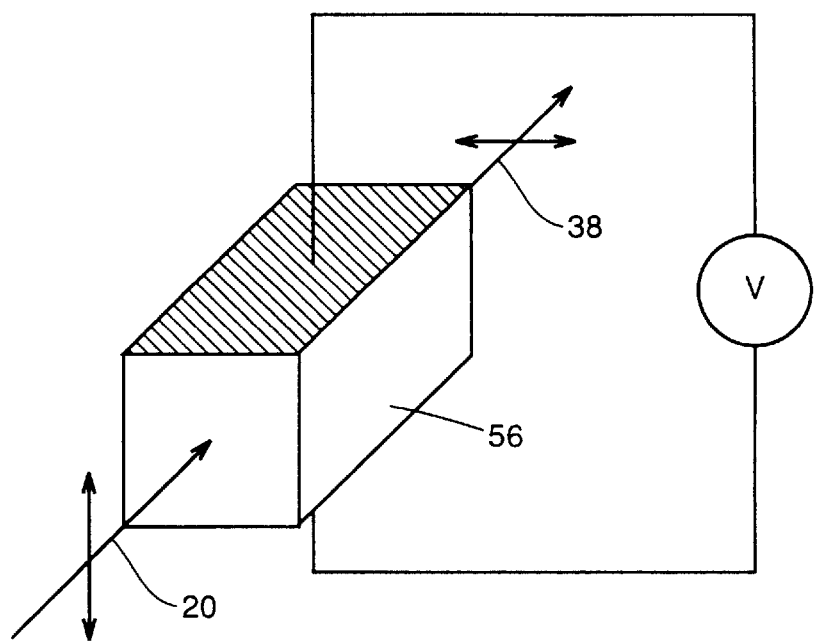
FIG. 17 is a perspective view showing a Pockels cell that can be used instead of the TN type liquid crystal in the polarization plane rotating unit of FIG. 16.

A Pockels cell 56 as shown in FIG. 17 can be used instead of TN liquid crystal 44. When a predetermined voltage is applied, this Pockels cell 56 alters a laser beam 20 having a plane of polarization in the vertical direction in the drawing into a laser beam 38 having a plane of polarization in the lateral direction. Since the rotation angle of the plane of polarization can be altered by adjusting the applied voltage, the rotating angle of the plane of polarization can be adjusted so that optimum reproduction characteristics are obtained.

Figure 18:
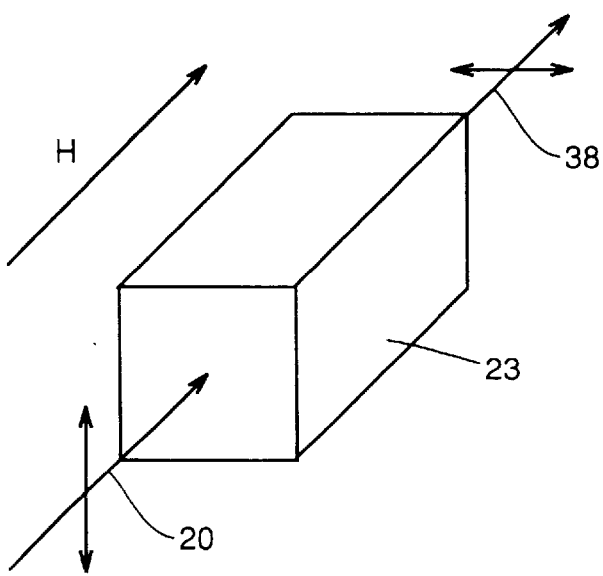
FIG. 18 is a perspective view showing a Faraday element that an be used instead of the TN type liquid crystal in the polarization plane rotating unit of FIG. 16.
Figure 19:
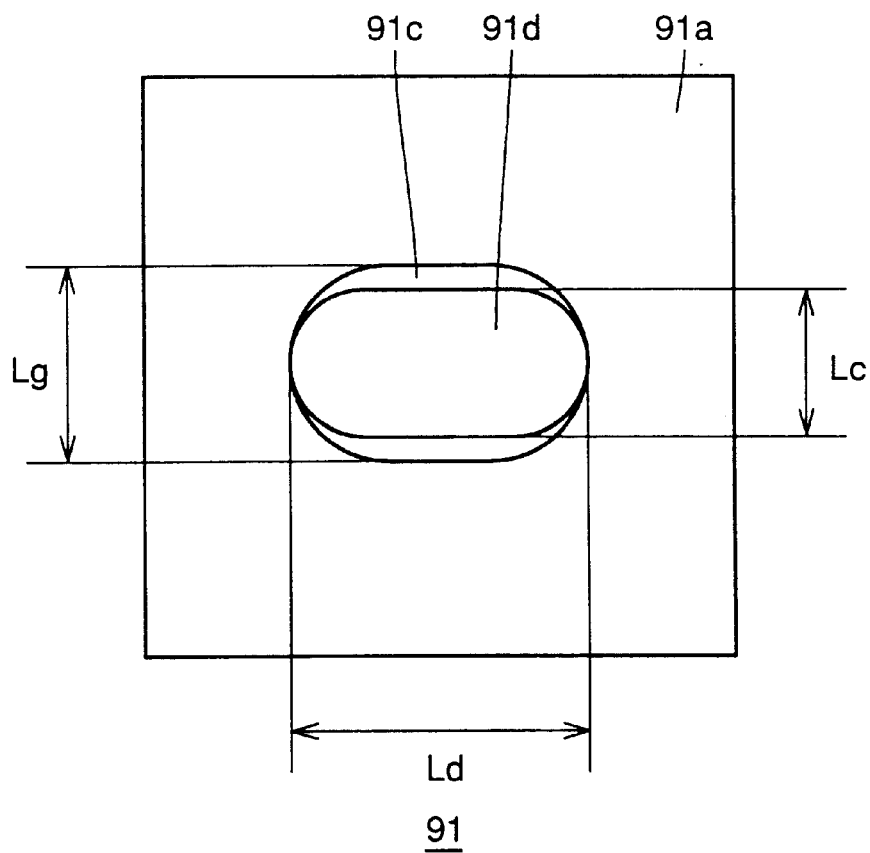
FIG. 19 is a front view of another polarization plane rotating unit of FIG. 15.

A Faraday element 23 that rotates the plane of polarization magnetically as shown in FIG. 18 can be used instead of TN liquid crystal 4. Faraday element 23 rotates the plane of polarization of the laser beam by 90° when a magnetic field H is applied. A coil is wound around a tube supporting Faraday element 23 since the passing direction of the laser beam matches the applied direction of magnetic field H in Faraday element 23. Thus, the assembly and structure of Faraday element 23 is simplified.

In the above-described fourth embodiment, the diameter of central region 91b of polarization plane rotating unit 91 parallel to the track running direction is determined so that the effective numerical aperture of objective lens 5 becomes 0.35 in the track running direction. The diameter of central region 91b parallel to the tracking direction is determined by adding a length of two times the tracking following range to the diameter parallel to the track running direction.

However, the diameter of central region 91b parallel to the track running direction may be selected so that the effective numerical aperture of objective lens 5 becomes 0.35 in the track running direction, and the diameter parallel to the tracking direction can be determined by adding two times the length of the tracking following range to the diameter in parallel with the track running direction. Here, the effective numerical aperture of objective lens 5 in the tracking direction is desirably not smaller than 0.35.

Although polarizing film 92a for transmitting only laser beam with the plane of polarization in parallel with the plane of the drawing sheet is used in the fourth embodiment, a polarizing film that transmits only a laser beam having a plane of polarization perpendicular to the plane of the drawing sheet may be used. In this case, the polarization direction of the laser beam emitted from semiconductor laser 1 is opposite to that described above, or the ON/OFF of the voltage of polarization plane rotating unit 91 is set opposite to that described above.

Objective lens 5 designed so that a laser beam is focused at a position of 0.6 mm in depth is used in the fourth embodiment. Alternatively, an objective lens designed so that a laser beam is focused at a position between the depth of 0.7 mm to 0.9 mm can be used. When an objective lens having a numerical aperture of 0.6 (tolerance ±0.05) and an effective luminous flux diameter of 4 mm is used that is designed so that a laser beam is focused at a position of 0.8 mm in depth, diameter Lc of region 91c of polarization plane rotating unit 91 parallel to the track running direction is set to 3.47 mm, and diameter Ld parallel to the tracking direction is set to 4 mm. As a result, the effective numerical aperture of objective lens 5 in the track running direction becomes 0.52 (tolerance ±0.02). Therefore, a beam spot formed on signal recording plane 60a has a diameter of 1 (tolerance ±0.1) μm and 1.1 (tolerance ±0.1) μm in the track running direction and the tracking direction, respectively, in reading out from a DVD of the SD standard.

In reproduction from a CD, diameter Lc is set to 3 mm, and diameter Ld is set to 4 mm. As a result, the effective numerical aperture of objective lens 5 in the track running direction becomes 0.45 (tolerance ±0.02). Therefore, the laser beam formed on signal recording plane 6a has a diameter of 1.2 (tolerance ±0.1) μm and 1.3 (tolerance ±0.1) μm in the track running direction and the tracking direction, respectively in reading out from a CD. Information can be reproduced from a DVD of the MMCD standard of high density having a substrate of 1.2 mm in thickness, as in the above-described CD.

By using an objective lens having a numerical aperture of 0.52 (tolerance ±0.02) designed so that a laser beam is focused at a position of 1.2 mm in depth, information can be reproduced stably from both a CD and a DVD of the MMCD standard. More specifically, voltage is applied to outermost region 91a of polarization plane rotating unit 91 in reproducing from a CD, and voltage is not applied to outermost region 91a of polarization plane rotating unit 91 in reproducing from a CVD of a MMCD standard. In this case, Lc of central region 91b of polarization plane rotating unit 91 parallel to the track running direction is set to 2.35 mm and diameter Ld parallel to the tracking direction is set to 3.7 mm as shown in FIG. 15. Although reproduction from a CD is possible even if the outermost portion of the laser beam is not intercepted, coma that is generated when the substrate of the CD is tilted or warped can be reduced if the effective numerical aperture of the objective lens in the track running direction is set to 0.35. Accordingly, further favorable reproduction can be provided.

The fourth embodiment can be modified appropriately similar to the first to third embodiments.

Fifth Embodiment

Figure 20:
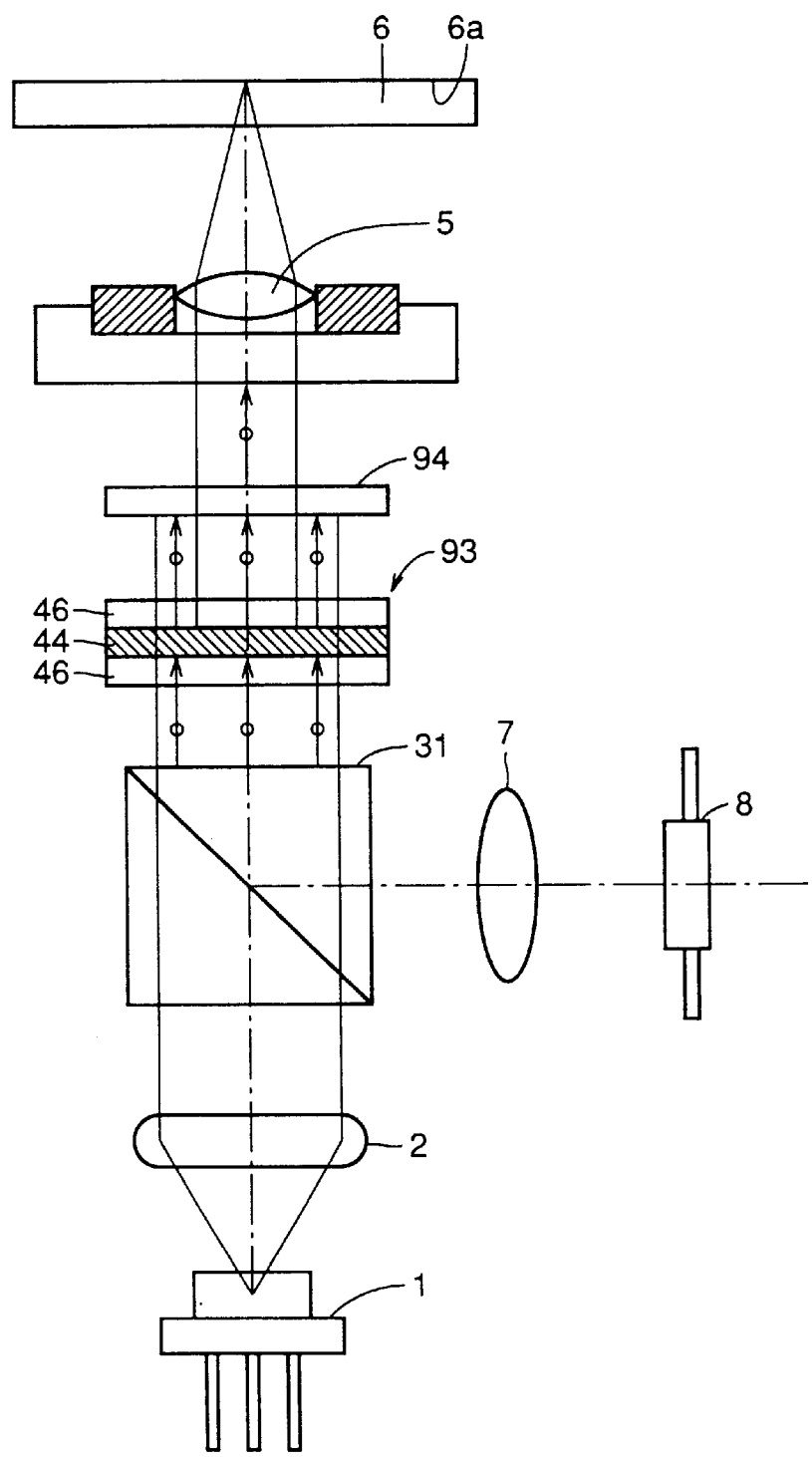
FIGS. 20 and 21 are schematic diagrams showing an optical structure of an optical pickup device in an optical disk recording/reproduction apparatus according to a fifth embodiment of the present invention, wherein the former and latter indicate reproduction from a compact disk and a digital video disk of the SD standard, respectively.
Figure 21:
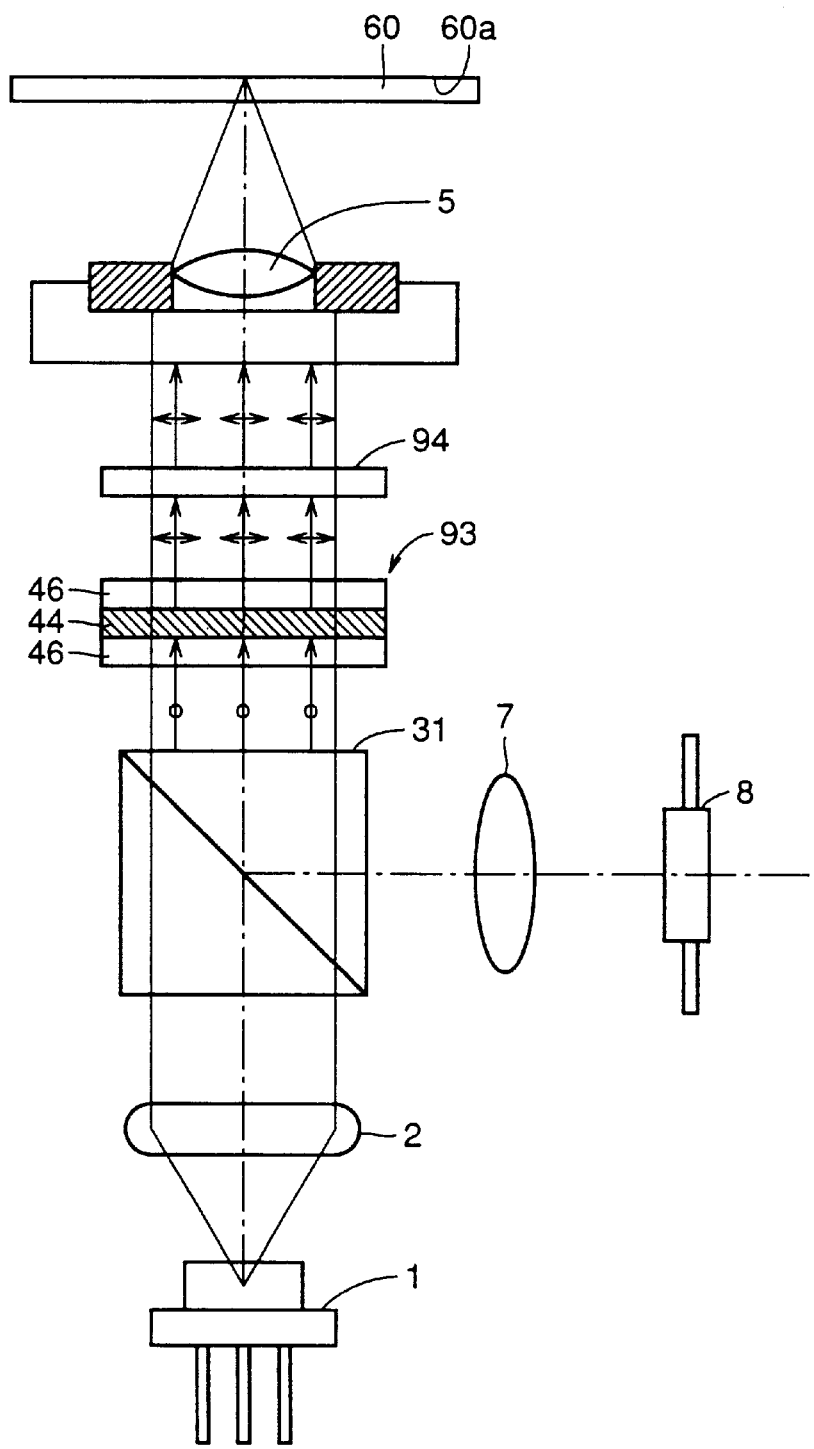

Referring to FIGS. 20 and 21, an optical disk recording/reproduction apparatus according to a fifth embodiment of the present invention includes a polarization plane rotating unit 93 that is not patterned as an alternative of polarization plane rotating unit 91 that is patterned, and a polarizing filter 94 that is patterned as an alternative of polarizing filter 92 that is not patterned. Objective lens 5 is designed so that a laser beam is focused at a position of 0.6 mm in depth as described above. Optical disk recording/reproduction apparatus can reproduce information from both a CD and a DVD of the SD standard as described above.

As shown in FIGS. 20 and 21, polarization plane rotating unit 93 includes a TN liquid crystal 44 and two transparent electrode plates 46 sandwiching TN liquid crystal 44. Differing from the above-described transparent electrode plate 45, transparent electrode plate 46 has a transparent conductive film formed over the entire surface. When voltage is applied to transparent electrode plate 46, polarization plane rotating unit 93 directly transmits all the incident laser beam without rotating the plane of polarization. When voltage is not applied to transparent electrode plate 46, polarization plane rotating unit 93 transmits all the incident laser beam with the plane of polarization rotated by 90°.

Figure 22:
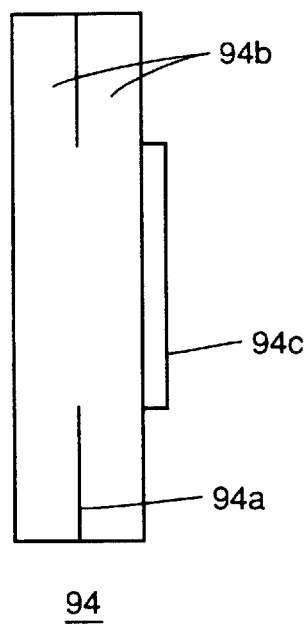
FIG. 22 is a side view showing a specific structure of a polarizing filter of FIGS. 20 and 21.

As shown in FIG. 22, polarizing filter 94 includes a doughnut-shaped polarizing film 94a, two glass plates 94b sandwiching polarizing filter 94a, and a film 97c affixed on the surface of glass plate 94b at the side of objective lens 5 and that does not have polarizing characteristics. Polarizing filter 94a intercepts the plane of polarization perpendicular to the plane of the drawing sheet. Although polarizing filter 94a transmits the plane of polarization that is parallel to the plane of the drawing sheet, the transmittance thereof is approximately 70–90%. If film 94c is not provided when a laser beam with a plane of polarization parallel to the plane of the drawing sheet is directed, difference in transmittance occurs between the central portion and the outermost portion of polarizing filter 94. Therefore, film 94c has a transmittance of approximately 70–90% to equalize the transmittance of polarizing filter 94 overall when a laser beam having a plane of polarization parallel to the plane of the drawing sheet is directed.

Figure 23:
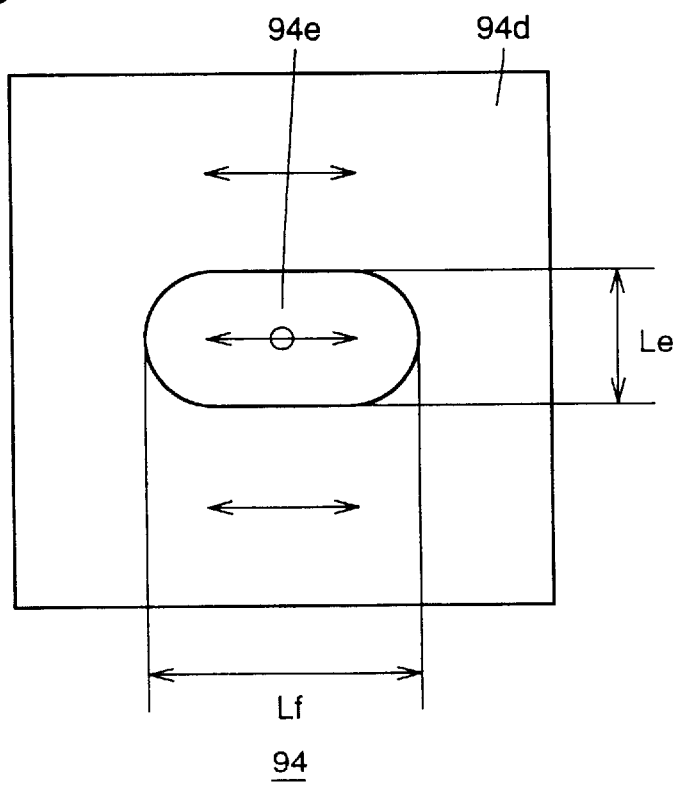
FIG. 23 is a front view of the polarizing filter of FIG. 22.

The polarizing characteristics of polarizing filter 94 is shown in FIG. 23. In an outermost region 94d of polarizing filter 94, only a laser beam that is polarized in the vertical direction in the drawing is transmitted. In a central region (opening) 94e of polarizing filter 94, laser beam polarized in any direction is passed through. When objective lens 5 has a numerical aperture of 0.6 (tolerance ±0.05) and an effective luminous flux diameter of 4 mm, a diameter Le of central region 94e parallel to the track running direction is set to 2.35 mm, and a diameter Lf parallel to the tracking direction is set to 3.7 mm. As a result, the effective numerical aperture of objective lens 5 in the track running direction becomes 0.35 (tolerance ±0.01). Jitter can be reduced even when the diameter parallel to the tracking direction is greater than 2.58 mm, i.e. greater than 1.1 times the diameter parallel to the track running direction.

An operation of reproduction from a DVD of the SD standard will be described hereinafter with reference to FIG. 21. When information is to be reproduced from a DVD of a SD standard, voltage is not applied to transparent electrode plate 46 of polarization plane rotating unit 93. TN type liquid crystal 44 rotates the plane of polarization of the laser beam by 90° as shown in FIG. 21. Therefore, all laser beams from collimator lens 2 having a plane of polarization perpendicular to the plane of the drawing sheet are polarized into laser beams having a plane of polarization parallel to the plane of the drawing sheet. Since central region 94e of polarizing filter 94 does not have polarizing characteristics, laser beam passes through central region 94e. Although outermost region 94d of polarizing filter 94 has polarizing characteristics, laser beam is transmitted through outermost region 94d as in central region 94e since the polarization direction matches that of the laser beam. Therefore, the laser beam is entirely transmitted without being intercepted by polarizing filter 94 to enter objective lens 5. The laser beam is focused on signal recording plane 60a of a DVD of the SD standard by objective lens 5. The diameter of the beam spot formed on signal recording plane 60a is 0.91 (tolerance ±0.1) μm.

Reproduction from a CD will be described hereinafter with reference to FIG. 20. When information is to be reproduced from CD, voltage is applied to transparent electrode plate 46 of polarization plane rotating unit 93. TN liquid crystal 44 passes the laser beam as shown in FIG. 20 without rotating the plane of polarization. The laser beam from polarization plane rotating unit 93 has a plane of polarization perpendicular to the plane of the drawing sheet identical to the laser beam from collimator lens 2. Since central region 94e of polarizing filter 94 does not have polarizing characteristics, the laser beam is passed through central region 94e. However, the laser beam is intercepted at outermost region 94d since that region has polarizing characteristics perpendicular to the laser beam. Thus, the laser beam is transmitted only through central region 94e of polarizing filter 94 to enter objective lens 5. The beam spot formed on signal recording plane 6a of the CD by objective lens 5 has a diameter of 1.5 (tolerance ±0.1) μm and 1.6 (tolerance ±0.1) μm parallel to the track running direction and the tracking direction, respectively.

By using a polarizing filter 94 having a central region (opening) 94e extensive in the tracking direction as shown in FIG. 23 in the fifth embodiment, jitter can be reduced significantly as a function of increase of the tracking following range comparable to that of a polarizing filter having a circular central region.

A semiconductor laser that can selectively generate two laser beams having planes of polarization orthogonal to each other as described above can be used instead of polarization plane rotating unit 93 of the fifth embodiment. Some examples of such a semiconductor laser are set forth in the following.

Figure 24:
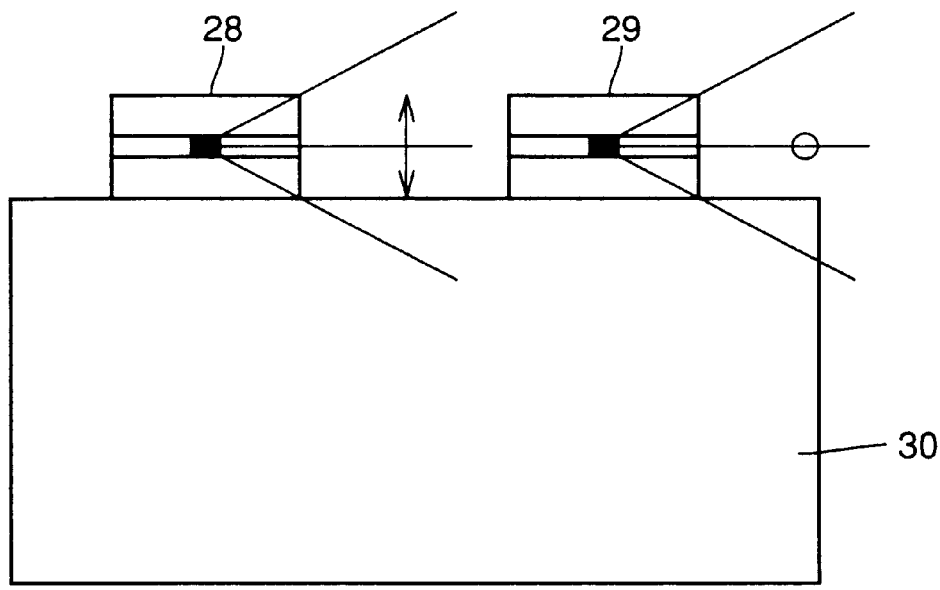
FIGS. 24–27 show the method of rotating the plane of polarization of a laser beam instead of the polarization plane rotating unit of FIGS. 20 and 21.

Referring to FIG. 24, a semiconductor laser 27 includes a laser element 28 for generating a laser beam that is polarized in a vertical direction in the drawing, another laser element 93 for generating a laser beam that is polarized in a lateral direction in the drawing, and a base 30 having laser elements 28 and 29 both mounted. Although the laser beam in FIG. 24 is illustrated so as to be emitted rightwards in the drawing for the sake of convenience, it is actually issued at an upward right angle to the plane of the drawing sheet. This also applies to FIGS. 25 and 26. In semiconductor laser 27 of FIG. 24, laser elements 28 and 29 are activated alternately.

Figure 25:
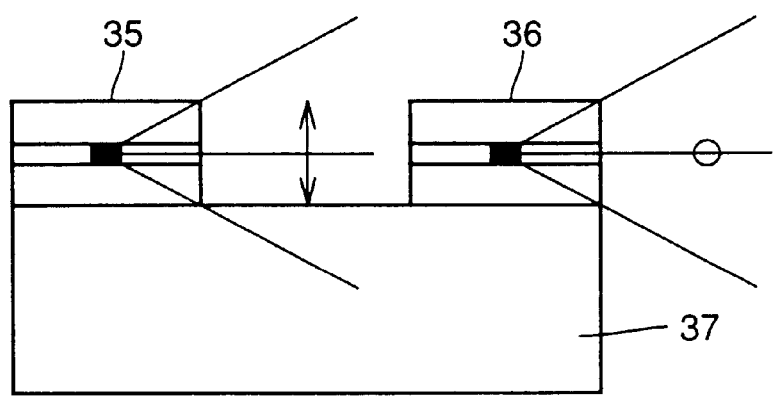

Referring to FIG. 25, laser elements 31 and 32 having a plane of polarization orthogonal to each other can be formed together on semiconductor substrate 33.

Figure 26:
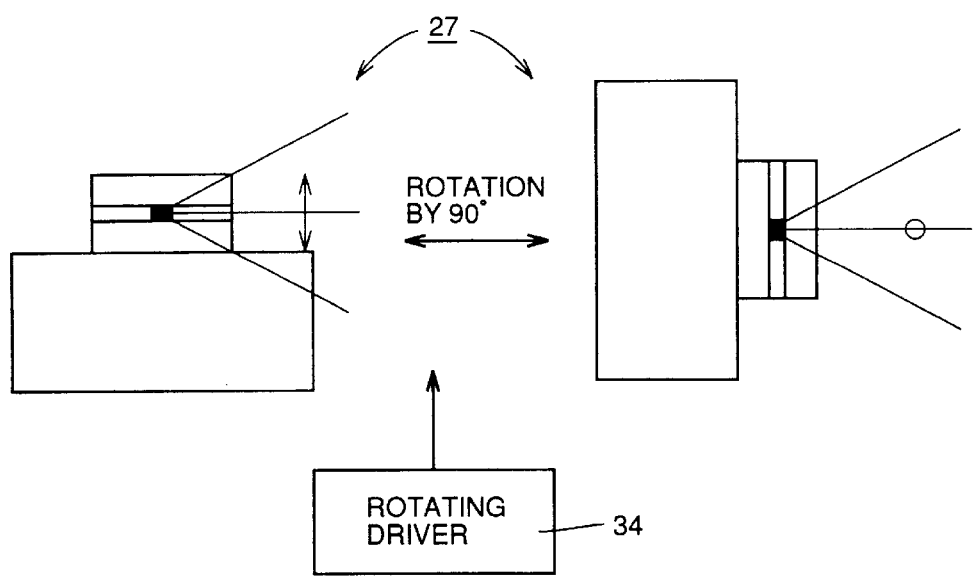

Referring to FIG. 26, semiconductor laser 27 can be rotated 90° by a rotation driver 34. Rotation driver 34 includes a base (not shown) supporting semiconductor laser 27, and a servo motor (not shown) for rotating the base 90°.

Figure 27:
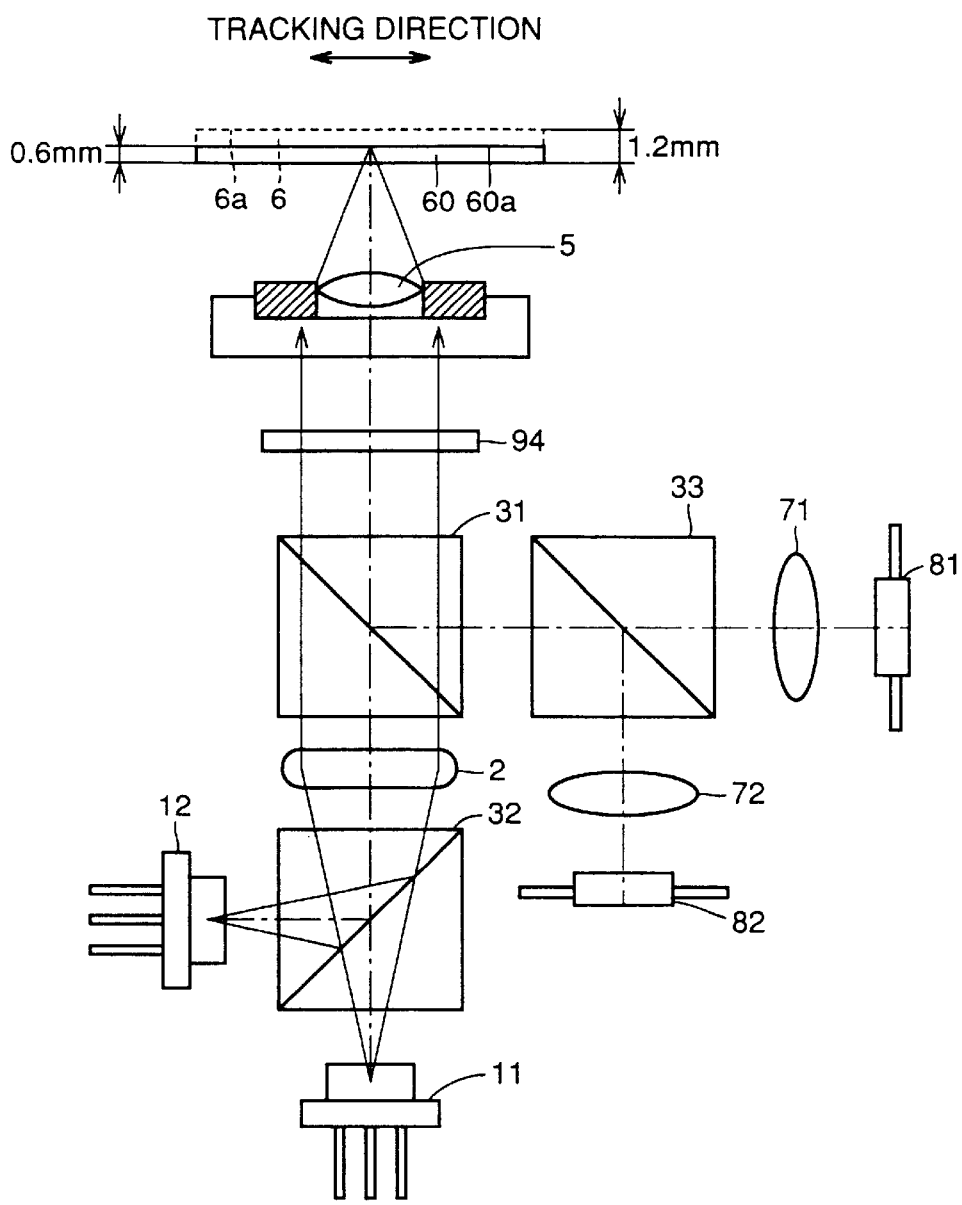

FIG. 27 shows a method of switching a laser beam using two semiconductor lasers 11 and 12 that emits two types of laser beams having the polarization direction orthogonal to each other. As shown in FIG. 27, a laser from semiconductor laser 11 that is polarized in a direction parallel to the plane of the drawing sheet is transmitted through beam splitter 32. The reflected light from an optical disk passes through polarization beam splitter 33 to be gathered into photodetector 81 by condenser lens 71. The laser beam from semiconductor laser 12 that is polarized in a direction perpendicular to the plane of the drawing sheet is reflected by polarization beam splitter 32. The reflected light from the optical disc is reflected by polarization beam splitter 33 to be gathered into photodetector 82 by condenser lens 72. As shown in FIG. 27, usage of photodetectors 81 and 82 eliminates the need of positioning semiconductor laser 12 with respect to the corresponding photodetector once the positioning of the photodector with respect to semiconductor laser 11 is determined.

Similar to the above-described fourth embodiment, a hologram element with polarizing characteristics or polarizing glass may be used instead of polarizing filter 94, provided that the polarizing characteristics thereof must be patterned.

Figure 28A:
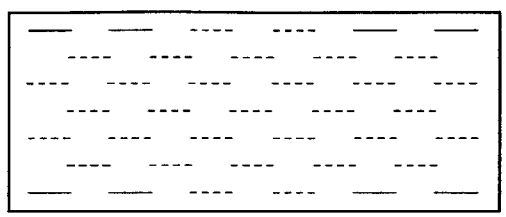
FIG. 28A is a front view for describing a polarizing glass.
Figure 28B:
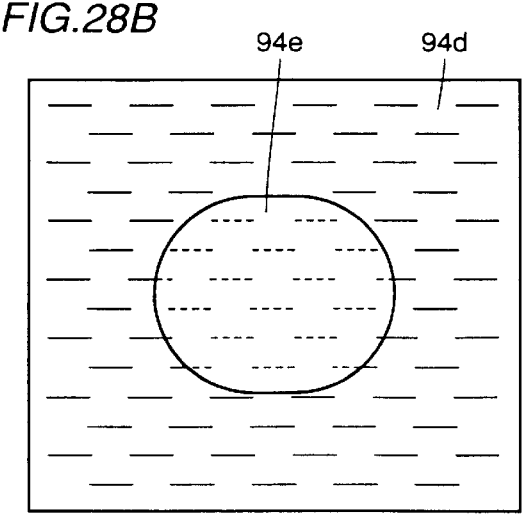
FIG. 28B is a front view of a polarizing glass used instead of the polarizing filter of FIGS. 20 and 21.

Polarizing glass is fabricated by having the silver compound in the glass arranged in a predetermined direction as shown in FIG. 28A, wherein the surface thereof is reduced to deposit silver. The reduced silver film has polarizing characteristics.

In polarizing glass used instead of polarizing filter 94, only the silver in outermost region 94d, not the silver in central region 94e, is deposited. Therefore, outermost region 94d of the polarizing glass has polarizing characteristics, whereas central region 94e does not.

Since the above-described polarizing glass uses silver, a laser beam that is polarized in a direction parallel to the plane of the drawing sheet passes through the polarizing glass, and a laser beam that is polarized in other directions does not pass through the polarizing glass. It is therefore not necessary to provide a film 94c as shown in FIG. 22 to lower the transmittance at the central region. Sufficient quantity of light can be obtained even when the luminous flux of the laser beam is narrowed. Any metal material that provides polarizing characteristics can be used for this polarizing glass, although silver is preferable.

Figure 28C:
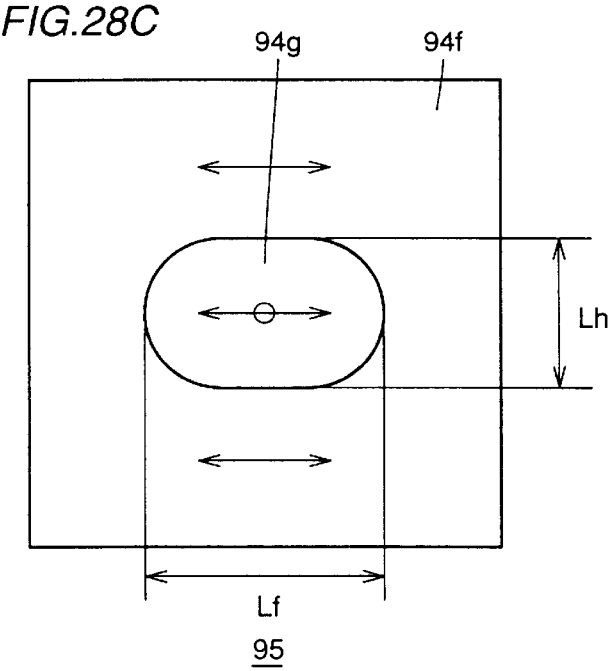
FIG. 28C is a front view of a polarizing filter used instead of the polarizing filter of FIG. 23 in reproduction from a CD.

In the above-described fifth embodiment, objective lens 5 designed so that a laser beam is focused at position of 0.6 mm in depth is used. However, an objective lens designed so that a laser beam is focused at a position between 0.7 mm and 0.9 mm in depth can be used. When an objective lens having a numerical aperture of 0.6 (tolerance ±0.05) and an effective luminous flux of 4 nm in diameter is used that is designed so that a laser beam is focused at the position of 0.8 mm in depth, a polarizing filter 95 as shown in FIG. 28c can be used as well as polarizing filter 94 shown in FIG. 23. Polarizing filters 94 and 95 are selectively inserted in the optical path of the laser beam by a slide mechanism and the like. In reproducing from a CD, polarizing filter 94 of FIG. 23 is inserted in the optical path of the laser beam. In reproducing from a DVD of the SD standard, polarizing filter 95 shown in FIG. 28C is inserted in the optical path of the laser beam. As shown in FIG. 28C, a diameter Lh of central region 94g of polarizing filter 95 parallel to the track running direction is set to 3.47 mm, and a diameter Lf parallel to the tracking direction is set to 4 mm. As a result, the effective numerical aperture of objective lens 5 in the track running direction becomes 0.52 (tolerance ±0.02). Therefore, the beam spot formed on signal recording plane 60a in reproducing from a DVD of the SD standard has a diameter of 1 (tolerance ±0.1) μm and 1.1 (tolerance ±0.1) μm parallel to the track running direction and the tracking direction, respectively.

The above-described fifth embodiment can be modified appropriately similar to the first to fourth embodiments.

Sixth Embodiment

The present invention is not limited to a laser beam having a wavelength of 585~685 nm or 600~700 nm as in the above-described embodiments. A laser beam having a short wavelength, for example, can be used. A laser beam having a wavelength within the range of 350~700 nm can be used. The effective numerical aperture of an objective lens is not limited to those described in the above embodiments. The effective numerical aperture can be set within the range of 0.20~0.65. Furthermore, the substrate of an optical disk from which information is to be reproduced is not limited to have a thickness of 1.2 mm and 0.6 mm as indicated in the above embodiments.

The following Table 1 shows rated values and reproduction conditions of respective optical disks when information is to be reproduced from a digital video disk of the SD standard, a compact disk, and a digital video disk of high density using a blue laser (wavelength: 350~450 nm, typical wavelength: 415~445 nm).

TABLE 1

| | | CD (Standard) | DVD (SD) | High density DVD |
|---|---|---|---|---|
| Rated value | Substrate thickness | 1.2 mm (1.1~1.3 mm) | 0.6 mm (0.55~0.65 mm) | 0.6 mm (0.55~0.65 mm) |
| | Pit length | 0.83 μm (0.80~0.90 μm) | 0.40 μm (0.38~0.42 μm) | 0.25 μm (0.20~0.30 μm) |
| | Pit depth | 110 nm (90~130 nm) | 105 nm (95~115 nm) | 72 nm (62~82 nm) |
| | Track pitch | 1.6 μm (1.5~1.7 μm) | 0.74 μm (0.69~0.79 μm) | 0.50 μm (0.42~0.58 μm) |
| Reproduction condition | Spot diameter | 1.51 μm (1.31~1.71 μm) | 0.92 μm (0.72~1.12 μm) | 0.63 μm (0.43~0.83 μm) |
| | Effective numerical aperture | 0.25 (0.20~0.30) | 0.41 (0.36~0.46) | 0.60 (0.55~0.65) |
| | Wavelength (Blue laser) | | 430 nm (350~450 nm) | |

Figure 28D:
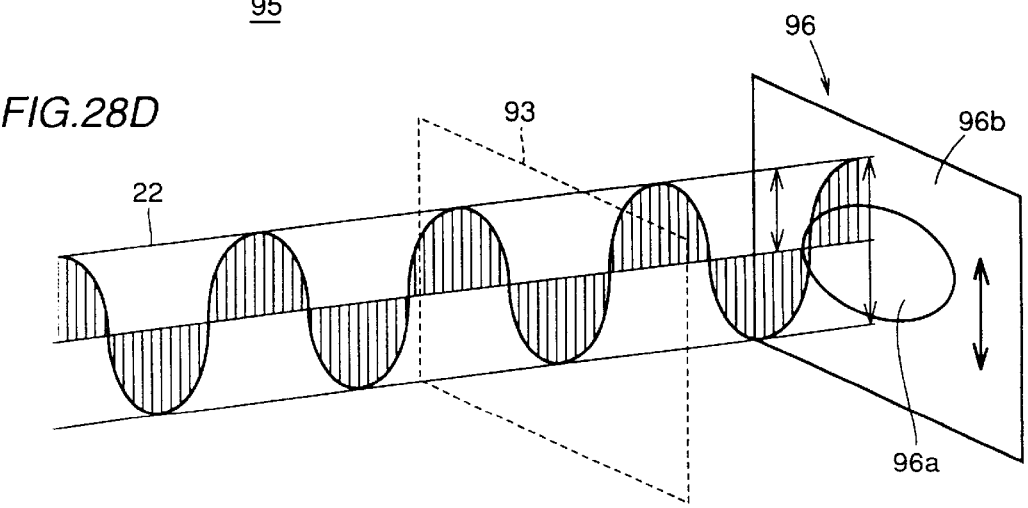
FIG. 28D is a perspective view of a polarizing filter having a polarization direction different from that of a polarizing filter in FIGS. 20 and 21.

In the fifth embodiment, polarization plane rotating unit 93 directly transmits the laser beam without rotating the plane of polarization in reproducing from a CD as shown in FIG. 20, and transmits the laser beam with the plane of polarization rotated in reproducing from a DVD as shown in FIG. 21. Therefore, polarizing filter 94 includes polarizing characteristics perpendicular to the polarization direction of the laser entering polarization plane rotating unit 93 as shown in FIG. 23. However, polarizing filter 96 as shown in FIG. 28D can include an opening 96a that does not have polarizing characteristics, and an outermost region 96b having polarizing characteristics in a direction identical to the polarization direction of laser beam 22 prior to entering polarization plane rotating unit 93. In this case, polarization plane rotating unit 93 rotates the plane of polarization of laser beam 22 in reproducing from a CD, and does not rotate the plane of polarization of laser beam 22 in reproducing from a DVD. Therefore, all the laser beam 22 passes through polarization plane rotating unit 93 and also through polarizing filter 96 in reproducing from a DVD. In reproducing from a CD, the plane of polarization is rotated by polarization plane rotating unit 93. Therefore, the outer-most portion of laser beam 22 is intercepted by polarizing filter 96, and only the central portion of laser beam 22 passes through polarizing filter 96.

In a digital video disk of high density, the substrate thickness is 0.6 (tolerance ±0.05) mm, the pit length 0.25 (tolerance ±0.05) μm, pit depth 72 (tolerance ±10) nm, and track pitch 0.50 (tolerance ±0.08) μm. Therefore, a digital video disk of high density has a recording density greater than that of the SD standard.

It is appreciated from Table 1 that the effective numerical aperture of the objective lens is set to 0.20~0.30 in reproducing from a compact disk, to 0.36~0.46 in reproducing from a digital video disk of the SD standard, and to 0.55~0.65 in reproducing from a digital video disk of high density. The effective numerical aperture of an objective lens can be altered according to the methods described in the above embodiments. Although reproduction can be obtained from a digital video disk of the SD standard, a compact disk, and a digital video disk of high density using a blue laser, it is to be noted that a blue laser is suitable for reproduction from a digital video disk of the SD standard for a digital video disk of high density.

The following Table 2 shows the rated values and reproduction conditions of various optical disks in reproducing from the above-mentioned optical disks using a green laser (wavelength: 450~550 nm; typical wavelength: 517~547 nm).

TABLE 2

|  |  | CD (Standard) | DVD (SD) | High density DVD |
|---|---|---|---|---|
| Rated value | Substrate thickness | 1.2 mm (1.1~1.3 mm) | 0.6 mm (0.55~0.65 mm) | 0.6 mm (0.55~0.65 mm) |
|  | Pit length | 0.83 μm (0.80~0.90 μm) | 0.40 μm (0.38~0.42 μm) | 0.25 μm (0.20~0.30 μm) |
|  | Pit depth | 110 nm (90~130 nm) | 105 nm (95~115 nm) | 88 nm (78~98 nm) |
|  | Track pitch | 1.6 μm (1.5~1.7 μm) | 0.74 μm (0.69~0.79 μm) | 0.50 μm (0.42~0.58 μm) |
| Reproduction condition | Spot diameter | 1.55 μm (1.35~1.75 μm) | 0.94 μm (0.74~1.14 μm) | 0.78 μm (0.58~0.98 μm) |
|  | Effective numerical aperture | 0.30 (0.25~0.35) | 0.50 (0.45~0.55) | 0.60 (0.55~0.65) |
|  | Wavelength (Green laser) |  | 532 nm (450~550 nm) |  |

It is appreciated from the above Table 3 that the effective numerical aperture of the objective lens is set to 0.25~0.35 in reproducing from a compact disk, to 0.45~0.55 in reproducing from a digital video disk of the SD standard, and to 0.55~0.65 in reproducing from a digital video disk of the SD standard of further high density. The effective numerical aperture of the objective lens can be altered by the methods shown in the above embodiments. Although a green laser is suited for reproduction from a digital video disk of the SD standard and a compact disk, it can be used to reproduce information from a digital video disk of high density.

Reproduction can be provided from only a digital video disk of the SD standard and a compact disk using the above-described blue laser. In this case, the numerical aperture of the objective lens is set to 0.36~0.60, and the effective numerical aperture of the opening is selectively switched within the range of 0.25~0.35. When reproduction is to be carried out only from two types of a digital video disk of the SD standard and a compact disk using a green laser, the numerical aperture of the opening should be selectively switched within the range of 0.20~0.30.

Seventh Embodiment

Although the above embodiments are described only about reproduction from an optical disk, the present invention is also applicable in recording information onto an optical disk. By using a semiconductor laser having a wavelength of 680 (tolerance ±15) nm, 650 (tolerance ±50) nm, 635 (tolerance ±50) nm, 500 (tolerance ±50) nm or 400 (tolerance ±50) nm, and a power of 30 mW, information can be recorded onto a digital video disk of the SD standard, a compact disk, and a digital video disk of high density. In this case, the effective numerical aperture of the objective lens is set so as to suit each of the above-described optical disks and wavelengths.

Eighth Embodiment

Figure 29:
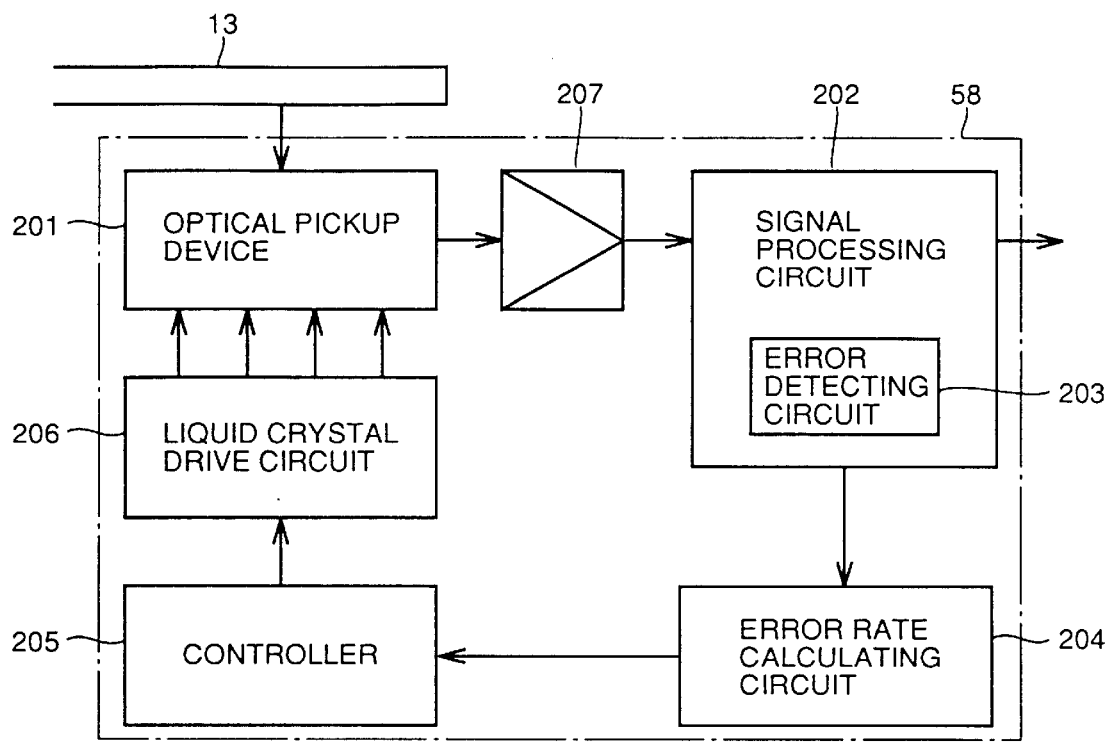
FIG. 29 is a block diagram schematically showing a structure of an optical disk recording/reproduction apparatus according to an eighth embodiment of the present invention.
Figure 30:
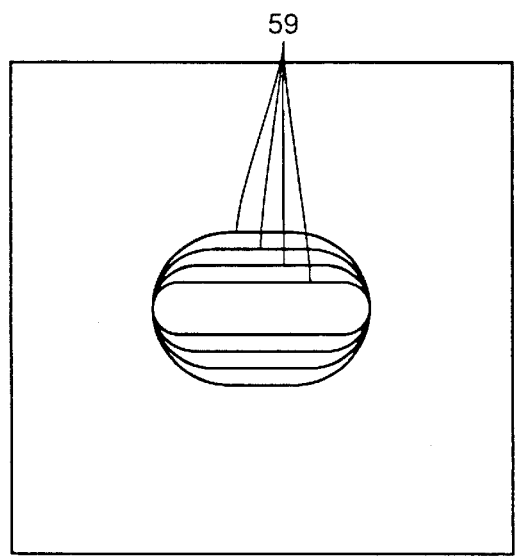
FIG. 30 is a front view of a polarization plane rotating unit used in the optical disk recording/reproduction apparatus of FIG. 29.

In the above embodiments, the effective numerical aperture of the objective lens is altered according to the thickness of the substrate or recording density of the optical disk. Alternatively, the effective numerical aperture of the objective lens can be altered in multistages according to the error rate of a detected reproduced signal. For this purpose, an optical disk recording/reproduction apparatus 58 according to an eighth embodiment of the present invention shown in FIG. 29 includes an optical pickup device 201, an amplifier 207 for amplifying a reproduced signal from optical pickup device 201, a signal processing circuit 202 for processing an amplified reproduced signal, an error rate calculation circuit 204 for calculating an error rate generated within a predetermined time period according to an output of an error detection circuit 203 in signal processing circuit 202, a liquid crystal drive circuit 206 for driving polarization plane rotating unit 57 as shown in FIG. 30 in optical pickup device 201, and a controller 205 to provide control of liquid crystal drive circuit 206 according to an error rate from error rate calculation circuit 204. Polarization plane rotating unit 57 includes a polarity of openings 59 of different diameter as shown in FIG. 30. One of the plurality of openings 59 is selected, and the plane of polarization of a laser beam passing through the selected opening is rotated. However, the plane of polarization of a laser beam passing through the outer side portion of the selected opening 59 is not rotated.

According to the eighth embodiment of the present invention, the diameter of opening 59 parallel to the track running direction can readily be set so that the error rate in correlation with the amount of jitter is minimized by virtue of the polarization diameter of opening 59 altered according to the error rate.

Ninth Embodiment

Figure 31:
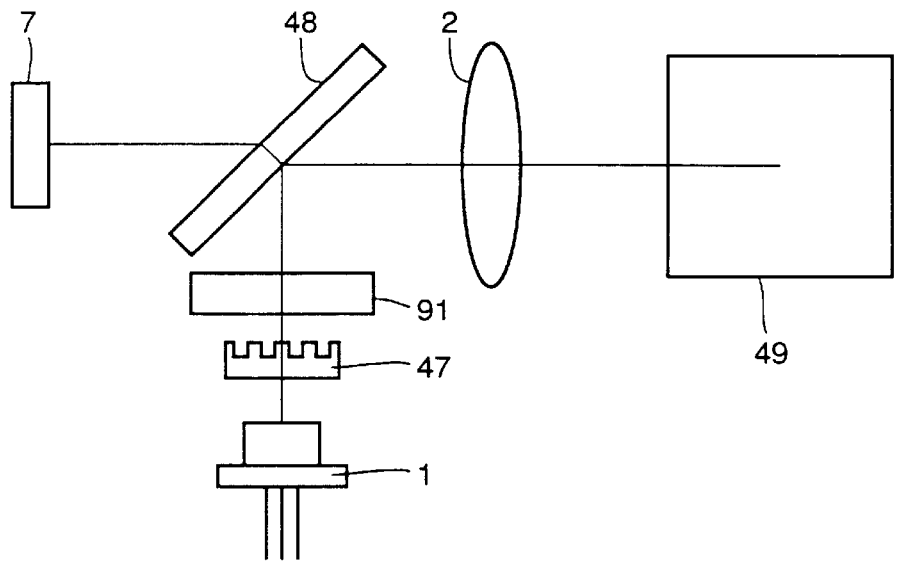
FIG. 31 schematically shows an optical system of an optical pickup device in an optical disk recording/reproduction apparatus according to a ninth embodiment of the present invention.
Figure 32:
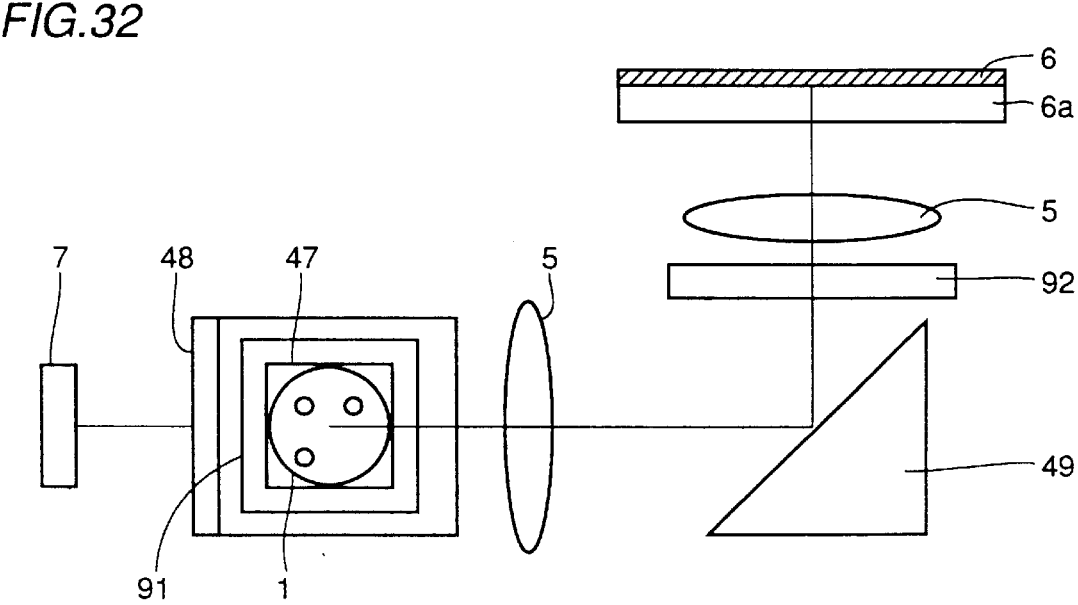
FIG. 32 is a side view of the optical system of FIG. 31.

In an optical disk recording/reproduction apparatus of a ninth embodiment of the present invention shown in FIG. 31, a half mirror plate 48 is used instead of a polarization beam splitter. A patterned polarization plane rotating unit 91 is inserted between half mirror plate 48 and a diffracting grating 47. FIG. 31 shows diffraction grating 47 and reflecting mirror 49 not shown in the above embodiments. Diffraction grating 47 functions to form two beam spots for tracking control in addition to the beam spot for reproduction. Since polarization plane rotating unit 91 of the ninth embodiment is patterned, polarizing filter 92 shown in FIG. 32 does not have to be patterned. Thus, polarization plane rotating unit 91 can be provided, not immediately before polarizing filter 92, but between half mirror plate 48 and diffraction grating 47.

Tenth Embodiment

Figure 33:
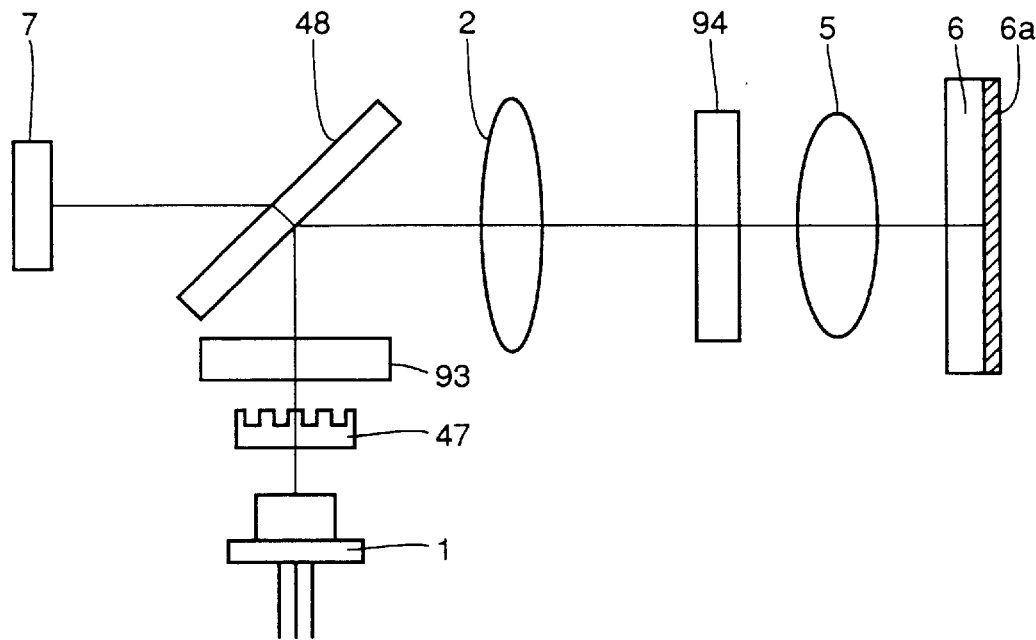
FIG. 33 schematically shows an optical system of an optical pickup device in an optical disk recording/reproduction apparatus according to a tenth embodiment of the present invention.

Referring to FIG. 33 of an optical disk recording/reproduction apparatus according to a tenth embodiment of the present invention, a half mirror plate 48 is used instead of a polarization beam splitter. A polarization plane rotating unit 93 that is not patterned is inserted between half mirror 48 and diffraction grating 47. Since polarization plane rotating unit 93 is not patterned differing from that of the ninth embodiment, polarizing filter 94 is patterned. A reflecting mirror is not shown in FIG. 33.

Eleventh Embodiment

Figure 34:
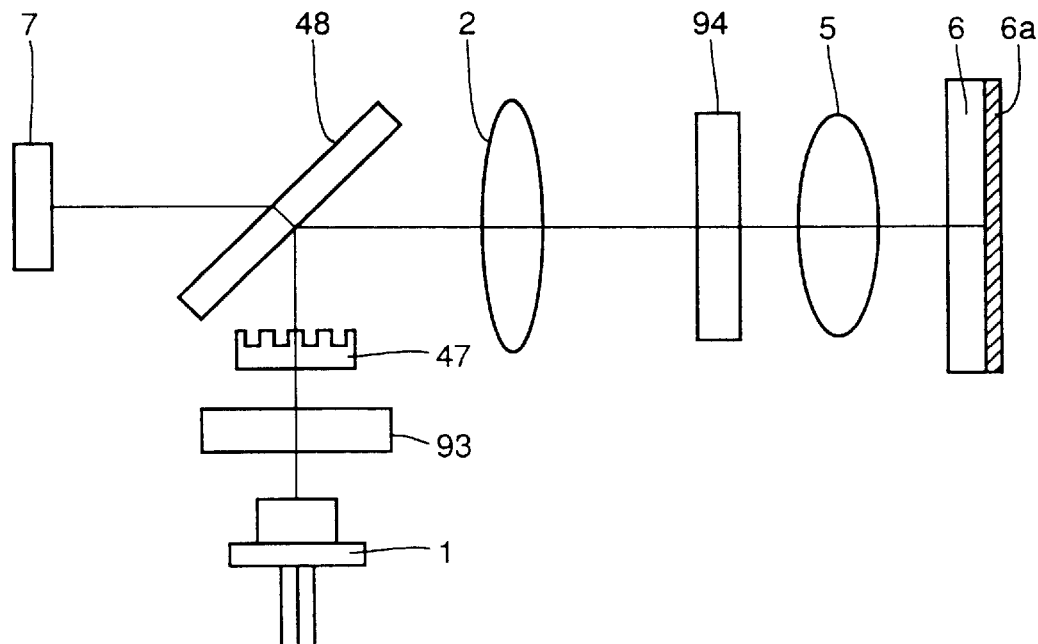
FIG. 34 schematically shows an optical system of an optical pickup device in an optical disk recording/reproduction apparatus according to an eleventh embodiment of the present invention.

Referring to FIG. 34 of an optical disk recording/reproduction apparatus according an eleventh embodiment of the present invention, polarization plane rotating unit 93 and diffraction grating 47 are provided in a manner opposite to that shown in FIG. 33. Polarization plane rotating unit 93 can be inserted between diffraction grating 47 and semiconductor laser 1.

Twelfth Embodiment

Figure 35:
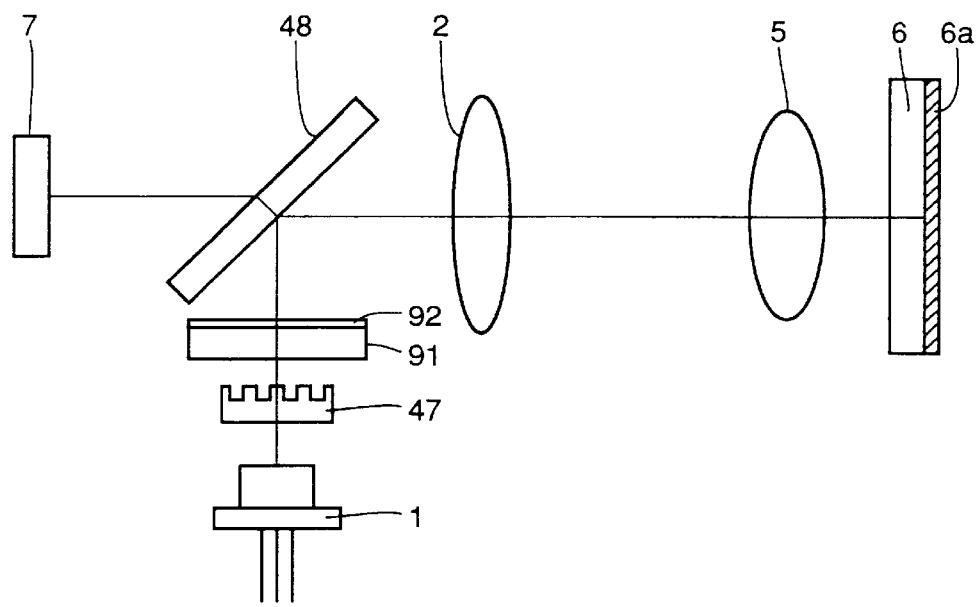
FIG. 35 schematically shows an optical system of an optical pickup device in an optical disk recording/reproduction apparatus according to a twelfth embodiment of the present invention.

An optical disk recording/reproduction apparatus according to a twelfth embodiment of the present invention is shown in FIG. 35. Differing from FIG. 31, a polarizing filter 92 that is not patterned is affixed, not immediately before objective lens 5, but on the rear side surface of pattern polarization plane rotating unit 91. By providing polarization plane rotating unit 91 and polarizing filter 92 in a unitary manner, the correction and assembly required to modify the effective numerical aperture of objective lens 5 is simplified.

The present invention is not limited to the twelfth embodiment in which polarization plane rotating unit 91 is patterned and polarization filter 92 is not patterned. An opposite version is allowed in which the polarizing filter is patterned and the polarization plane rotating unit is not patterned.

Although the diameter of the opening in the tracking direction is preferably determined by adding two times the tracking following range to the diameter of the opening in the track running direction, the present invention is not particularly limited to this multiple of 2.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical recording/reproduction apparatus for recording and/or reproducing information to/from an optical disk, said optical disk recording/reproduction apparatus comprising:

an objective lens opposite to said optical disk;

an optical system for providing a laser beam to said objective lens;

tracking control means for moving said objective lens in a radial direction of said optical disk to make said laser beam trace a track of said optical disk; and light intercepting means for passing said laser beam therethrough without intercepting said laser beam in case that said optical disk has a first standard, and intercepting a portion of said laser beam to set said laser beam to include a first diameter along said radial direction of said optical disk and a second diameter shorter than said first diameter along a tangential direction of said optical disk which is orthogonal to said radial direction in case that said optical disk has a second standard different from said first standard.

2. The optical disk recording/reproduction apparatus according to claim 1, wherein said light intercepting means includes an aperture.

3. The optical disk recording/reproduction apparatus according to claim 2, wherein said aperture has an oblong opening of a fixed configuration, wherein said light intercepting means further includes insertion means for inserting said aperture in an optical path of said laser beam.

4. The optical disk recording/reproduction apparatus according to claim 2, wherein said aperture has an oblong opening that can be deformed mechanically.

5. The optical disk recording/reproduction apparatus according to claim 2, wherein said aperture has an oblong opening that can be deformed electrically.

6. The optical disk recording/reproduction apparatus according to claim 5, wherein said aperture is a liquid crystal shutter including an oblong opening that can be deformed electrically.

7. The optical disk recording/reproduction apparatus according to claim 6, wherein said liquid crystal shutter includes a guest-host element.

8. The optical disk recording/reproduction apparatus according to claim 1, further comprising a laser for generating said laser beam, wherein said optical system includes a polarization beam splitter, and a quarter wave plate positioned between said polarization beam splitter and said objective lens, wherein said light intercepting means is positioned between said quarter wave plate and said objective lens.

9. The optical disk recording/reproduction apparatus according to claim 1, wherein said light intercepting means includes an oblong opening having a third diameter corresponding to said first diameter and a fourth diameter corresponding to said second diameter and at least 1.1 times said third diameter.

10. The optical disk recording/reproduction apparatus according to claim 9, wherein said fourth diameter is 1.1–2.0 times said third diameter.

11. The optical disk recording/reproduction apparatus according to claim 10, wherein said fourth diameter is 1.2–1.4 times said third diameter.

12. The optical disk recording/reproduction apparatus according to claim 9, wherein said oblong opening has arc shapes at opposite sides.

13. The optical disk recording/reproduction apparatus according to claim 9, wherein said oblong opening is a rectangle.

14. The optical disk recording/reproduction apparatus according to claim 9, wherein said oblong opening is a polygon having at least six angles.

15. The optical disk recording/reproduction apparatus according to claim 9, wherein said laser beam has a wavelength of 350–700 nm.

16. The optical disk recording/reproduction apparatus according to claim 9, wherein said objective lens has an effective numerical aperture of 0.20–0.65.

17. The optical disk recording/reproduction apparatus according to claim 9, wherein said objective lens is designed so as to conform to the thickness of a substrate of a digital video disk having a first recording density, wherein said light intercepting means does not intercept said laser beam in reproducing from said digital video disk, and intercepts an outermost portion of said laser beam in reproducing from a compact disk having a second recording density lower than said first recording density.

18. The optical disk recording/reproduction apparatus according to claim 17, wherein a substrate of said digital video disk is 0.55–0.65 nm in thickness, and a substrate of said compact disk is 1.1–1.3 mm in thickness.

19. The optical disk recording/reproduction apparatus according to claim 18, wherein said laser beam has a wavelength of 350–450 nm, said objective lens has a numerical aperture of 0.55–0.65, and said light intercepting means alters the effective numerical aperture of said objective lens to 0.36–0.46.

20. The optical disk recording/reproduction apparatus according to claim 18, wherein said laser beam has a wavelength of 350–450 nm, said objective lens has a numerical aperture of 0.36–0.60, and said light intercepting means alters the effective numerical aperture of said objective lens to 0.20–0.30.

21. The optical disk recording/reproduction apparatus according to claim 19, wherein said laser beam has a wavelength of 415–445 nm.

22. The optical disk recording/reproduction apparatus according to claim 18, wherein said laser beam has a wavelength of 450–550 nm, said objective lens has a numerical aperture of 0.55–0.65, and said light intercepting means alters the effective numerical aperture of said objective lens to 0.45–0.55.

23. The optical disk recording/reproduction apparatus according to claim 18, wherein said laser beam has a wavelength of 450–550 nm, said objective lens has a numerical aperture of 0.45–0.60, and said light intercepting means alters the effective numerical aperture of said objective lens to 0.25–0.35.

24. The optical disk recording/reproduction apparatus according to claim 22, wherein said laser beam has a wavelength of 517–547 nm.

25. The optical disk recording/reproduction apparatus according to claim 18, wherein said laser beam has a wavelength of 585–685 nm, said objective lens has a numerical aperture of 0.55–0.65, and said light intercepting means alters the effective numerical aperture of said objective lens to 0.30–0.40.

26. The optical disk recording/reproduction apparatus according to claim 25, wherein said laser beam has a wavelength of 620–650 nm.

27. The optical disk recording/reproduction apparatus according to claim 18, wherein said laser beam has a wavelength of 600–700 nm, said objective lens has a numerical aperture of 0.55–0.65, and said light intercepting means alters the effective numerical aperture of said objective lens to 0.31–0.41.

28. The optical disk recording/reproduction apparatus according to claim 27, wherein said laser beam has a wavelength of 635–665 nm.

29. The optical disk recording/reproduction apparatus according to claim 18, wherein said laser beam has a wavelength of 350–450 nm, said objective lens has a numerical aperture of 0.55–0.65, and said light intercepting means alters the effective numerical aperture of said objective lens to 0.20–0.30.

30. The optical disk recording/reproduction apparatus according to claim 18, wherein said laser beam has a wavelength of 450–550 nm, said objective lens has a numerical aperture of 0.55–0.65, and said light intercepting means alters the effective numerical aperture of said objective lens to 0.25–0.35.

31. The optical disk recording/reproduction apparatus according to claim 1, wherein a standard of said optical disk is a thickness of a substrate of said optical disk.

32. The optical disk recording/reproduction apparatus according to claim 1, wherein said standard of an optical disk is a recording density of said optical disk.

33. An optical disk recording/reproduction apparatus for recording and/or reproducing information to/from an optical disk, the optical disk recording/reproduction apparatus comprising:

an objective lens disposed in association with the optical disk;

an optical system producing a laser beam to the objective lens;

a tracking servo mechanism disposed to move said objective lens in a radial direction of said optical disk to make said laser beam trace a track of said optical disk; and an aperture control device disposed between the optical system and the objective lens, the aperture control device defining an aperture that passes the laser beam therethrough without intercepting the laser beam in case that the optical disk has a first standard, and intercepting a portion of the laser beam to set the laser beam to include a first diameter along the radial direction of the optical disk and a second diameter shorter than the first diameter along a tangential direction of the optical disk which is orthogonal to the radial direction in case that the optical disk has a second standard different from the first standard.

34. The optical disk recording/reproduction apparatus according to claim 33, wherein the aperture has an oblong opening of a fixed configuration.

35. The optical disk recording/reproduction apparatus according to claim 33, wherein the aperture has an oblong opening that can be deformed mechanically.

36. The optical disk recording/reproduction apparatus according to claim 33, wherein the aperture has an oblong opening that can be deformed electrically.

37. The optical disk recording/reproduction apparatus according to claim 36, wherein the aperture is a liquid crystal shutter including an oblong opening that can be deformed electrically.

* * * * *